(12) United States Patent
Pasko et al.

(10) Patent No.: US 12,046,234 B1
(45) Date of Patent: Jul. 23, 2024

(54) PREDICTING ON-DEVICE COMMAND EXECUTION

(71) Applicant: Amazon Technologies, Inc., Seattle, WA (US)

(72) Inventors: Stanislaw Ignacy Pasko, Zawonia (PL); Bruno Dufour, Mississauga (CA); Dmitry M Sharygin, North York (CA); Peipei Tan, Oakville (CA)

(73) Assignee: Amazon Technologies, Inc., Seattle, WA (US)

( * ) Notice: Subject to any disclaimer, the term of this patent is extended or adjusted under 35 U.S.C. 154(b) by 490 days.

(21) Appl. No.: 17/359,932

(22) Filed: Jun. 28, 2021

(51) Int. Cl.
*G10L 15/22* (2006.01)
*G10L 15/183* (2013.01)

(52) U.S. Cl.
CPC ............ *G10L 15/22* (2013.01); *G10L 15/183* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 9,875,081 B2 * | 1/2018 | Meyers | G06F 3/167 |
| 10,235,997 B2 * | 3/2019 | Shah | H04N 21/42204 |
| 10,546,583 B2 * | 1/2020 | White | G10L 15/28 |
| 10,708,313 B2 * | 7/2020 | Lewis | G01S 5/0295 |
| 10,880,384 B1 * | 12/2020 | Li | G10L 15/22 |
| 11,150,922 B2 * | 10/2021 | Aggarwal | G06F 3/0488 |
| 11,295,745 B1 * | 4/2022 | Roy | G10L 15/30 |
| 11,670,293 B2 * | 6/2023 | Berg | H04S 7/301 |
| | | | 704/275 |
| 2003/0163308 A1 * | 8/2003 | Matsuo | G10L 15/07 |
| | | | 704/231 |
| 2013/0073293 A1 * | 3/2013 | Jang | G10L 15/22 |
| | | | 704/E21.001 |
| 2017/0025124 A1 * | 1/2017 | Mixter | G10L 15/22 |
| 2018/0211668 A1 * | 7/2018 | Willett | G10L 15/30 |
| 2019/0355365 A1 * | 11/2019 | Kim | G06F 1/3209 |
| 2021/0241775 A1 * | 8/2021 | Pasko | G10L 15/22 |

* cited by examiner

*Primary Examiner* — Seong-Ah A Shin
(74) *Attorney, Agent, or Firm* — Pierce Atwood LLP

(57) ABSTRACT

Some natural language command processing systems may handle some commands on a user device rather than sending input to another system for processing. Such a system may include an arbitration component for arbitrating between device and/or system processing. The arbitration component may execute in the system and render a device-specific decision as to whether the device will be able to process the input and/or execute the command, based on information known to the system about the device's capabilities. If the arbitration component predicts that the device will not be able to execute the command, the system may execute the command without waiting for a signal from the device. If the arbitration component predicts that the device will be able to execute the command, the system may halt processing to prevent duplicate execution.

20 Claims, 14 Drawing Sheets

PREDICTING ON-DEVICE COMMAND EXECUTION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
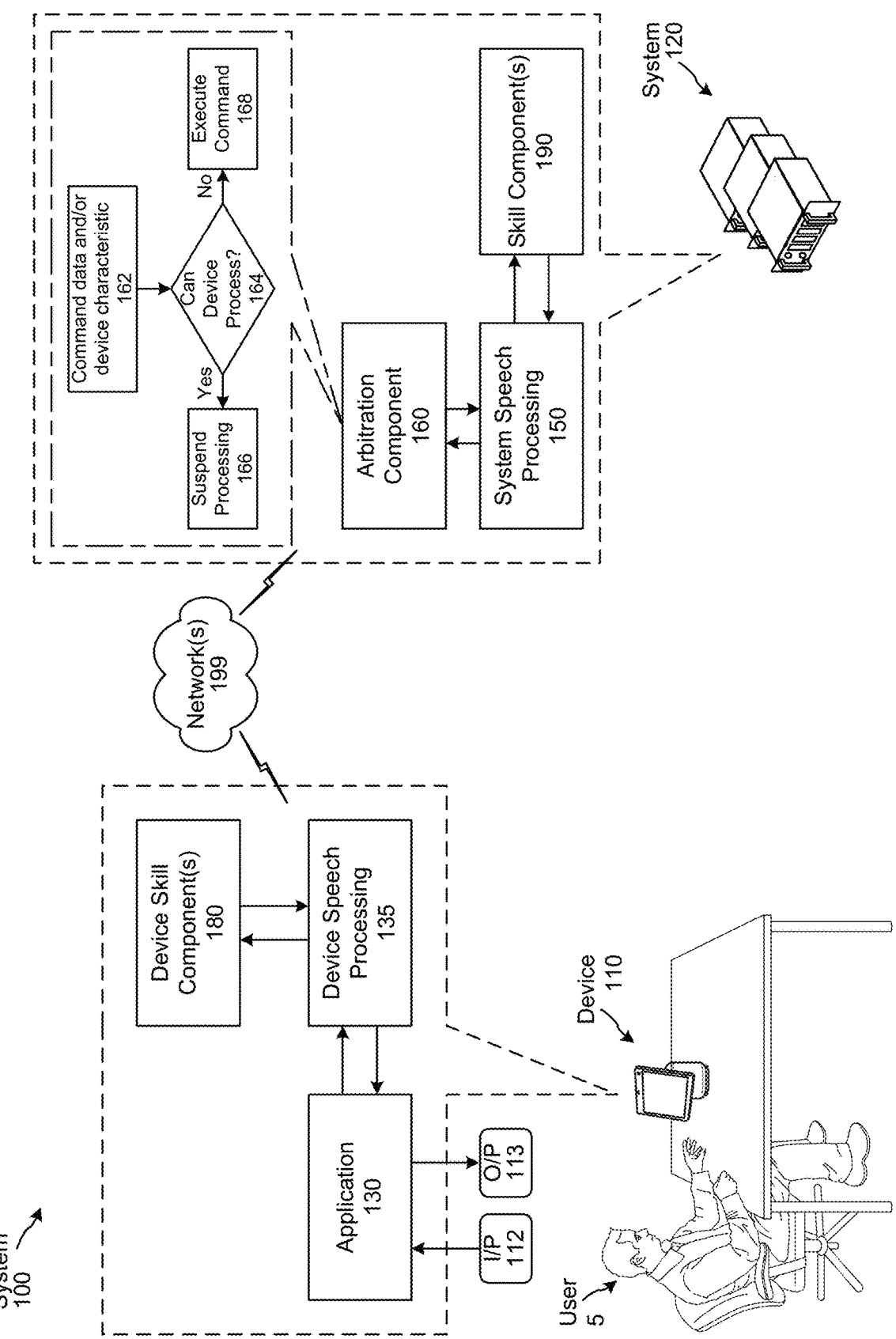
FIG. 1 is a conceptual diagram illustrating example components of a system for predicting on-device execution at another system, according to embodiments of the present disclosure.

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-processing system. The virtual assistant can leverage the speech-processing system as well as additional applications and/or skills to perform tasks for and/or on behalf of the user.

A speech processing system may include a user device connected via a network with another system. The user may speak (and/or provide other input) to the device, which may then send some or all of the input to the other system for processing. As user devices become more advanced (e.g., with increased processing power, memory, and/or other capabilities), some speech processing systems may perform some speech processing operations and/or execute certain commands on the device. If the device cannot process the speech and/or cannot execute the requested command, a system that has more/different capabilities may help with the processing. The device may send audio data representing the speech (and/or the other data) to a different system after attempting processing/execution itself. Alternatively, the device may send the audio data to the other system before or during attempted its own processing/execution.

This disclosure describes a speech processing system that may use an arbitration component to predict whether a different device will be able to process/execute with respect to an input. The arbitration component may maintain information regarding characteristics and/or capabilities of various devices, and thus predict based on device-specific knowledge whether the device will be able to execute a command on device. If the arbitration component predicts that the device will not process/execute the command, the system may execute the command without waiting for a signal from the device, thereby reducing latency. If the arbitration component predicts that the device will execute the command, the system may suspend processing, thereby preventing duplicate execution and/or collisions between competing actions. The system may, however, store an execution plan to use as a backup in the event on-device execution fails. Thus, if on-device execution fails after the arbitration component has determined that on-device execution would be possible, the system can execute the execution plan without delaying to receive and/or process the input.

The arbitration component may determine an execution decision for the command data. The arbitration component may determine whether the device and/or the other system may execute with respect to the command data. In some cases, the arbitration component may determine that only the user device may execute the command; e.g., because the command pertains to a function of the device itself, such as a volume control, car windows, lights in a smart home, etc. In some cases, the arbitration component may determine that only the system may execute the command; e.g., due to complexity of language in the input and/or a skill needed to generate a response or perform an action responsive to the command. In some cases, both the device and the other system may process the command. In such cases, the arbitration component may determine an execution decision that one of the device or the other system should attempt to execute the command first, with the other device/system suspending execution unless/until it receives an indication that execution has failed elsewhere or until a certain amount of time has elapsed without receiving a response.

The arbitration component may base on-device execution determinations based on device-specific information, policy data, and/or information regarding on-device skills. The device-specific information may include, for example, device type, software versions, hardware capabilities, and/or information regarding which virtual assistants may be enabled for use via the device. The policy data may include information regarding a set of domains, intents, and/or entities for which on-device execution is or is not possible. The on-device skill information may include which skill(s) are available on the device for on-device execution and whether the skill(s) can fulfill with respect to certain intents (e.g., command types).

In some implementations, the system may receive data from the device regarding an outcome of on-device execution. The system may use the outcome data to update the policy data. The system may include an arbitration monitor component that may observe arbitration component predictions and outcome data, and automatically update the policy data if it detects a discrepancy between the execution decision and the outcome data. For example, of the arbitration component determines that on-device execution is possible based on certain factors, yet the outcome data indicates that on-device execution failed, the arbitration monitor component may modify the policy data such that, for future commands having similar factors, the arbitration component will determine that on-device execution is not possible. Similarly, if the arbitration component determines that on-device execution is not possible, but observes that the device executes the command on-device, the arbitration monitor component may modify the policy data such that the arbitration component will determine that on-device execution is possible based on future commands having similar factors.

The aforementioned features are provided as examples, and maybe used in combination with each other and/or with additional features described herein.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating example components of a system for predicting on-device execution at another system, according to embodiments of the present disclosure. As shown in FIG. 1, the virtual assistant system 100 may include a voice-enabled device 110 local to a user 5, a natural language command processing system 120 (abbreviated "system 120"), and one or more skill support systems 325 (shown in FIG. 3) connected across one or more networks 199. Although the figures and discussion of the present disclosure illustrate certain steps in a particular order, the steps described may be performed in a different order (as well as certain steps removed or added) without departing from the present disclosure.

The device 110 may receive input 112 from the user 5 including audio corresponding to an utterance (e.g., a spoken natural language input). The device 110 may process audio following detection of a wakeword. The device 110 may generate audio data corresponding to the audio, and may process the audio data on-device and/or send the audio data to the system 120. The device 110 may send the audio data to the system 120 via an application 130 that is installed on the device 110 and associated with the system 120. An example of such an application 130 is the Amazon Alexa application that may be installed on a smart phone, tablet, or the like. In some implementations, the device 110 may receive one forms of input 112 such as text data 313 (shown in FIG. 3) corresponding to a natural language input originating from the user 5, and send the text data 313 to the system 120. The device 110 may also receive output data from the system 120, and generate output 113 (e.g., in the form of synthesized speech). The device 110 may include a camera for capturing image and/or video data for processing by the system 120. Examples of various devices 110 are further illustrated in FIG. 14, and an example device 110 is described with reference to FIG. 12. The system 120 may be remote system such as a group of computing components located geographically remote from device 110 but accessible via network 199 (for example, servers accessible via the internet). The system 120 may also include a system that is physically separate from device 110 but located geographically close to device 110 and accessible via network 199 (for example a home server located in a same residence as device 110). System 120 may also include some combination thereof, for example where certain components/operations are performed via a home server(s) and others are performed via a geographically remote server(s). An example system 120 is described with reference to FIG. 13.

The device 110 may include the components as shown in FIG. 1, including the application 130, device speech processing components 135, and one or more device skill components 180. The application 130 may receive input 112 and detect one or more wakewords corresponding to one or more virtual assistants. Upon detecting a wakeword, the application 130 may begin generating audio data corresponding to audio captured by the microphone. In some implementations, the application 130 may receive other indications to capture audio data; for example, a button press. The application 130 may send data such as audio data to the device speech processing components 135 and/or the system 120 for processing. The application 130 may receive responsive data from the system 120 and perform one or more actions such as outputting synthesized speech or doing something in the physical world such as actuate a car window or a house light.

The device speech processing components 135 may include ASR, NLU, and/or TTS components for recognizing, understanding, and/or generating natural language. In some cases, ASR, NLU, and/or TTS may employ models such as neural networks that may have a large memory footprint and require considerable processing power (compute). Some devices 110 such as mobile devices may have limited memory and/or compute; thus, in some cases, the device speech processing components 135 may be configured with limited speech processing and/or generation capabilities relative to the system speech processing components 150 executing on the system 120. In some cases, the device 110 may perform some speech processing operations using the device speech processing components 135, and send intermediate data (e.g., ASR results data) to the system 120 for further processing by the system speech processing components 150 (e.g., NLU, entity resolution, and/or command execution). Other distributions of speech processing operations and command execution are possible, including some operations performed both on-device and at the system 120.

Figure 4:
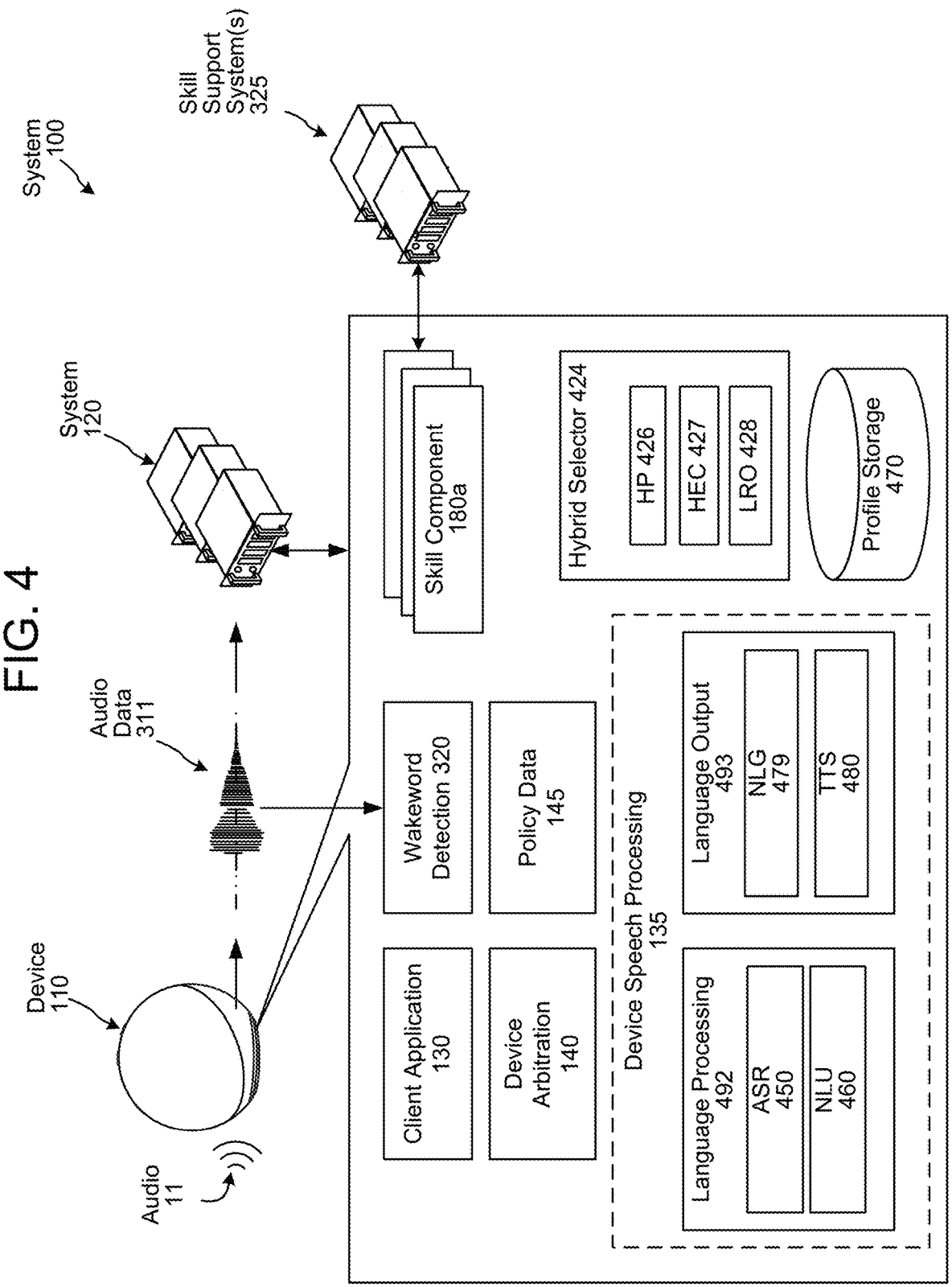
FIG. 4 is a conceptual diagram illustrating components that may be included in a device, according to embodiments of the present disclosure.
Figure 5:
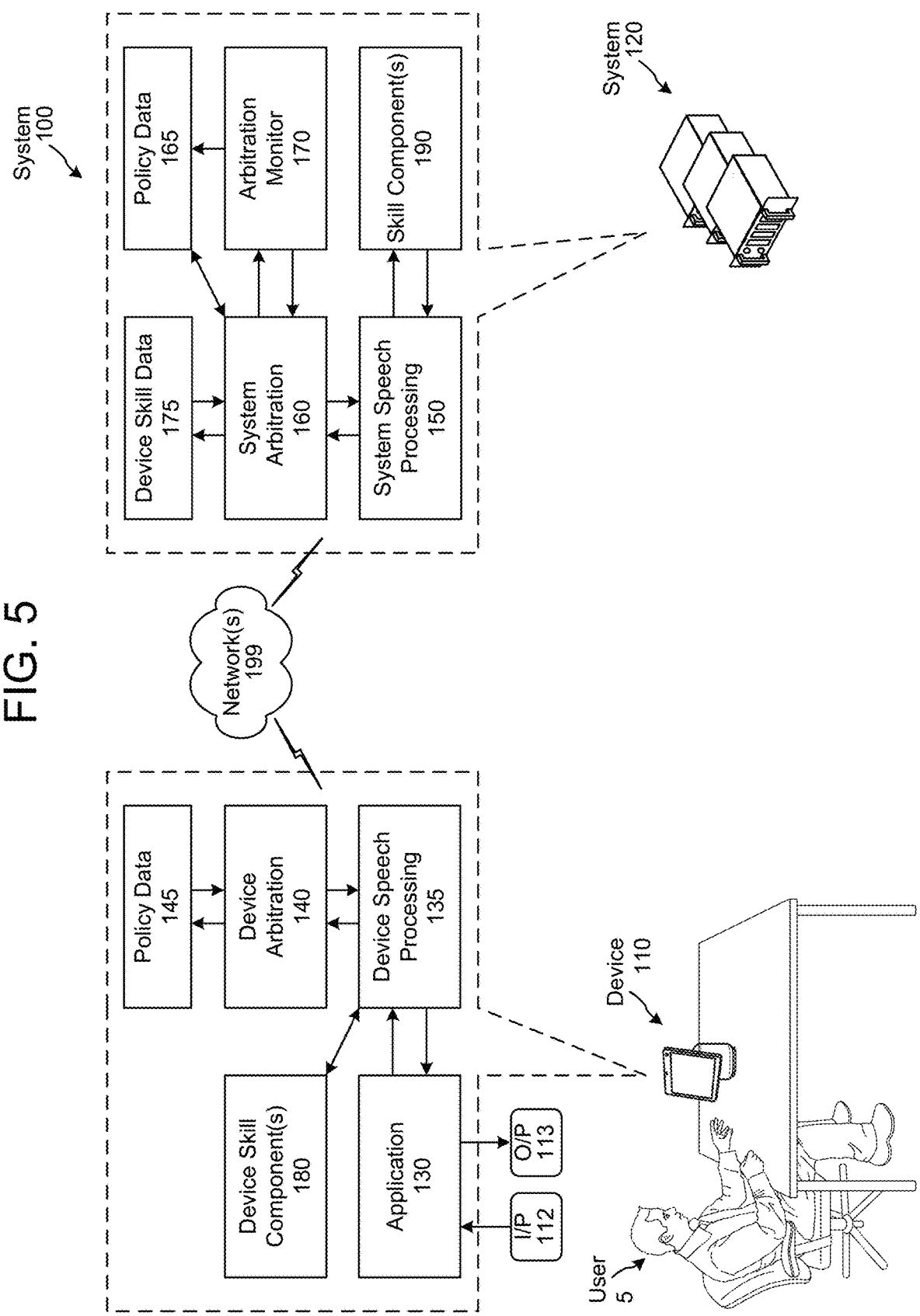
FIG. 5 is a conceptual diagram illustrating example of a system for determining an execution decision at the other system and on the device, according to embodiments of the present disclosure.
Figure 12:
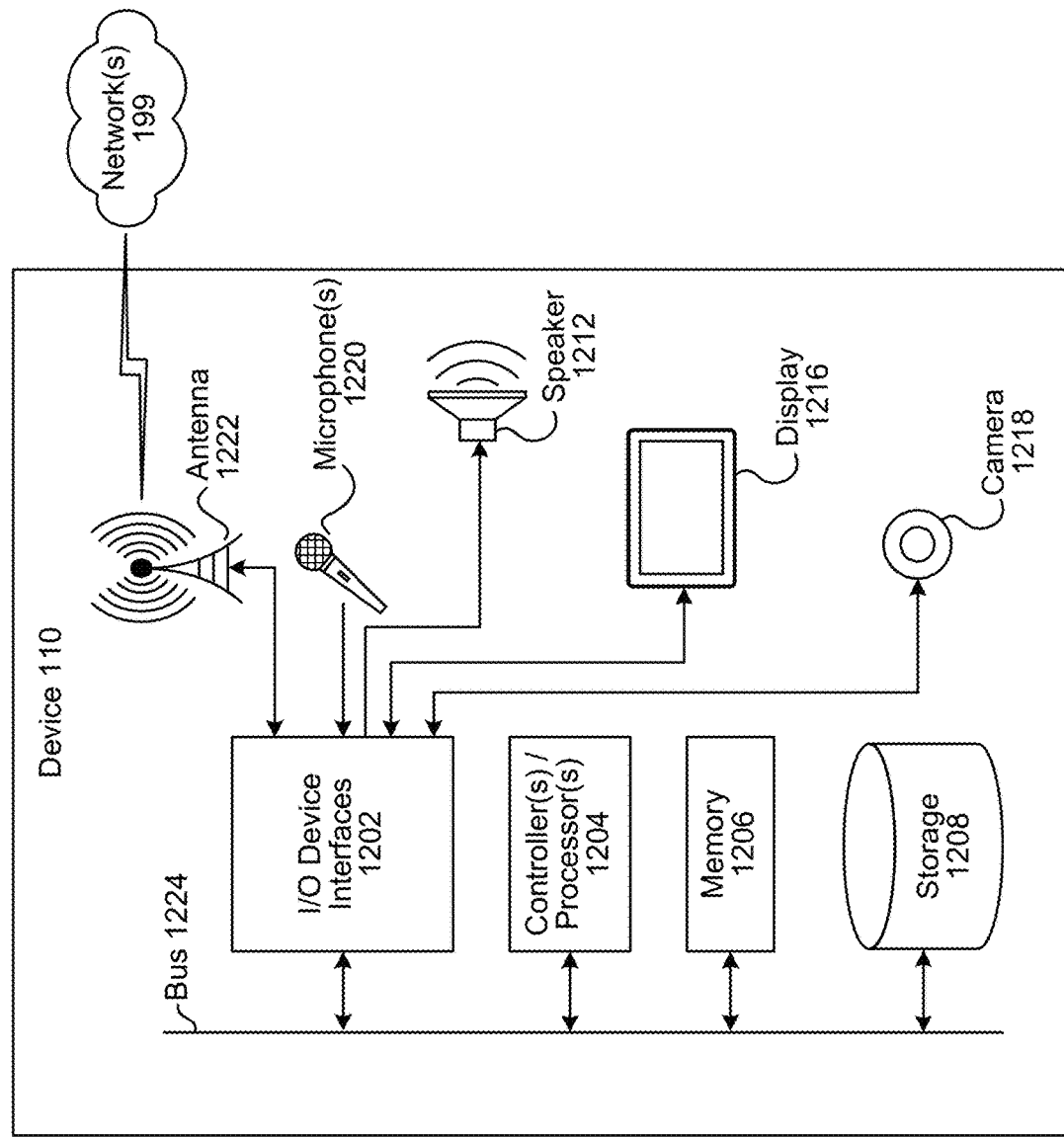
FIG. 12 is a block diagram conceptually illustrating example components of a device, according to embodiments of the present disclosure.

The device 110 may include one or more device skill components 180. A skill component may be software running on the device 110 and/or system 120 that is akin to a software application. That is, a skill component may enable the device 110 and/or system 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. Due to similar limitations with regard to memory and/or compute, the device 110 may include skill components 180 that may be limited in number and/or capabilities with respect to the skill components 190 of the system 120. These and other components of the device 110 are illustrated in FIG. 4, FIG. 5, and FIG. 12, and described in additional detail below.

Figure 2:
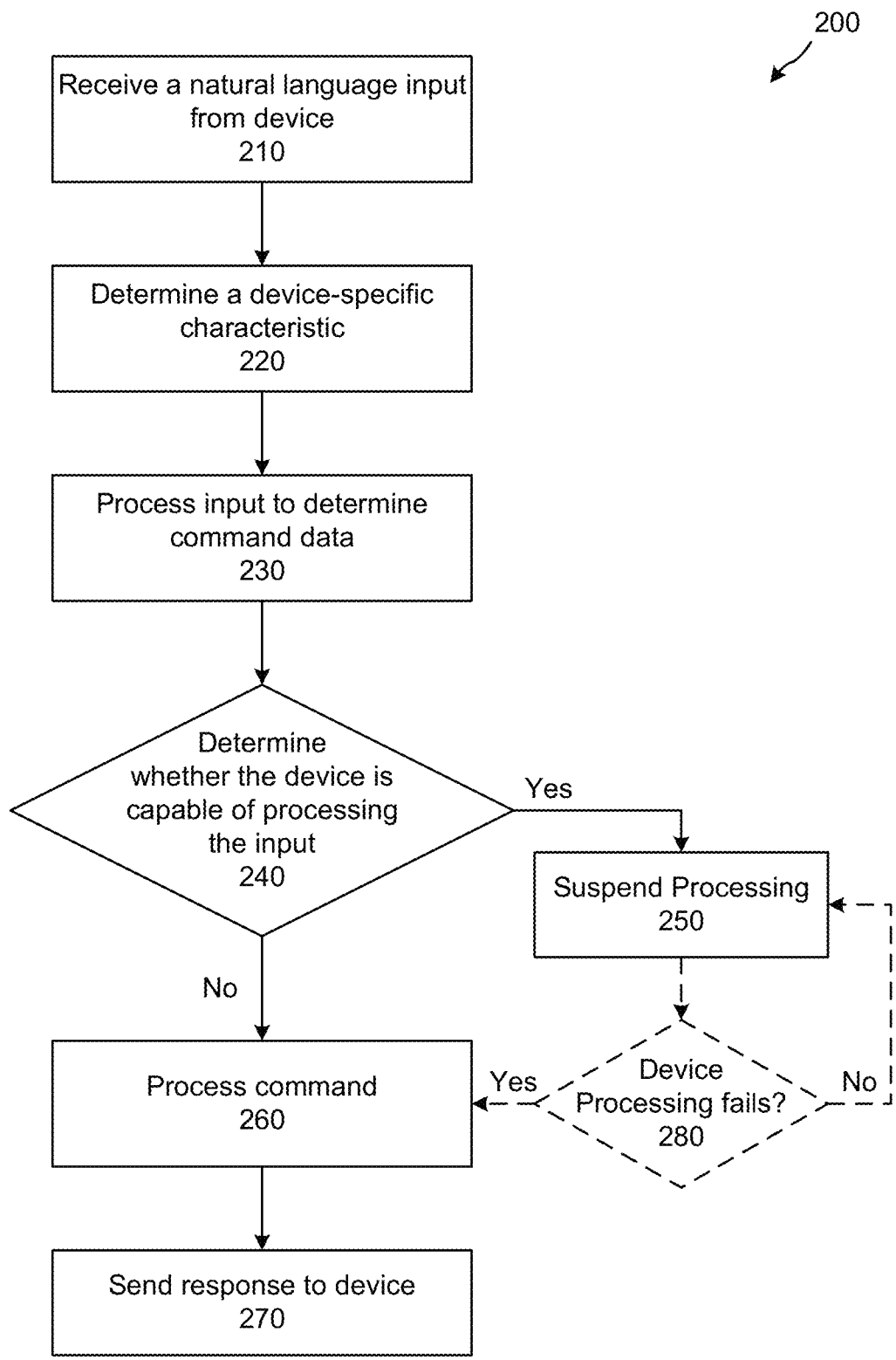
FIG. 2 is a flowchart illustrating example operations of a method of predicting on-device execution, according to embodiments of the present disclosure.
Figure 3:
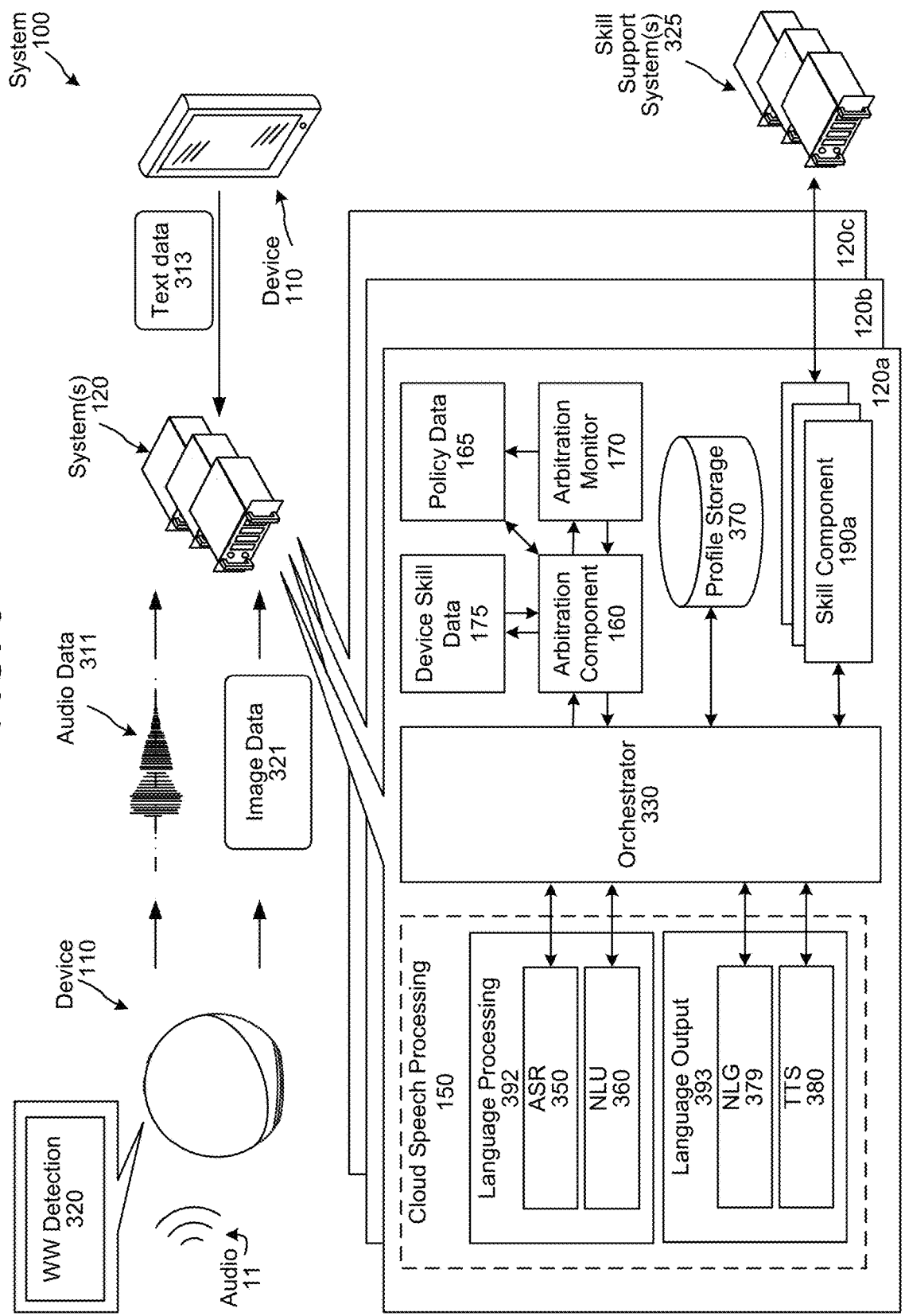
FIG. 3 is a conceptual diagram of components of the system, according to embodiments of the present disclosure.
Figure 13:
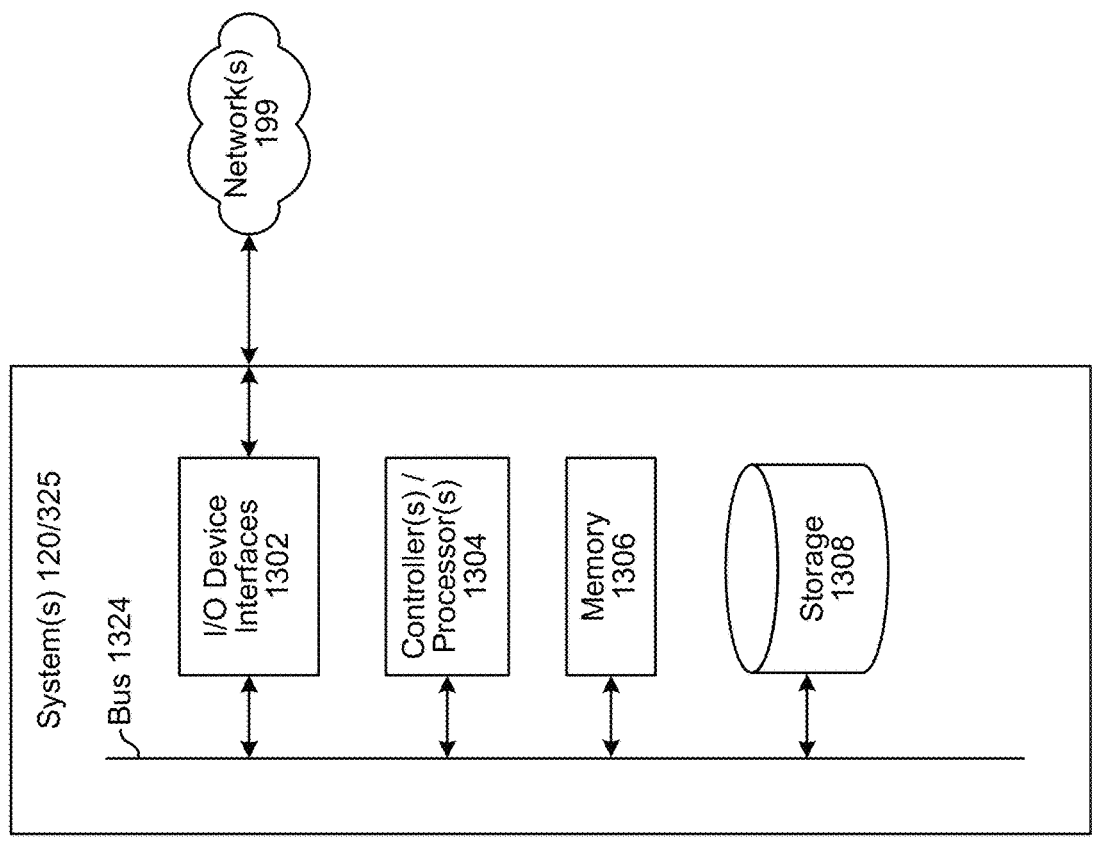
FIG. 13 is a block diagram conceptually illustrating example components of a system, according to embodiments of the present disclosure.

The system 120 may include the components as shown in FIG. 1, system speech processing components 150, and one or more skill components 190. Due to the difference in capabilities between device 110 speech processing and/or skills and the system's 120 speech processing and/or skills, there may be various situations in which, for example, the device 110 can process a command without help from the system 120, the system 120 can process a command but the device 110 cannot, and/or where both the device 110 and the system 120 can process the command but one is preferred (e.g., due to lower expected latency). Thus, the system 120 may include an arbitration component 160. The arbitration component 160 may receive (at a stage 162) command data (e.g., from the system speech processing components 150) and/or one or more device-specific characteristics of the device 110. The arbitration component 160 may determine (or "predict") (at a decision block 164) whether the device 110 will be able to process a command represented in the command data. If the arbitration component 160 determines that the device 110 is capable of processing the command ("Yes" at the decision block 164), the arbitration component 160 may indicate (at a stage 166) to the system 120 that it suspend processing. If the arbitration component 160 determines that the device 110 is not capable of processing the command ("No" at the decision block 164), the arbitration component 160 may indicate (at a stage 168) that the system 120 should execute the command. In some implementations, the arbitration component 160 may output additional possible execution decisions; for example, and without limitation, system only, system first, device only, device first, any, device decides, etc. FIG. 2, described below, illustrates example operations for predicting on-device execution. Components of the system 120 are illustrated in FIGS. 3, 5, and 13, and described in additional detail below.

FIG. 2 is a flowchart illustrating example operations of a method 200 of predicting on-device execution, according to embodiments of the present disclosure. The method 200 may be performed by components of the system 120 in conjunction with the device 110. The method 200 may include receiving (210) a natural language input from the device 110. The input may include audio data representing a spoken utterance, a textual input (e.g., entered using a keyboard or touchscreen), image data representing a photograph of text, video data represent American Sign Language, etc. The method 200 may include determining (220) a device-specific characteristic. The device-specific characteristic may include hardware and/or software capabilities of the device including, for example and without limitation, a device type, model, and/or version; an operating system type or version; hardware features of the device such as the presence of a camera or screen; installed apps; connected devices such as smart home devices and/or appliances; skills installed; virtual assistants available or enabled for use on the device; speech processing and/or speech generation models installed, etc. In some implementations, the method 200 may include determining multiple device-specific characteristics. The device-specific characteristics may allow the arbitration component 160 to make granular predictions regarding whether the device 110 may process a command base on, for example, whether it has speech-processing models capable of understanding the particular language used and/or whether it has a device skill component 180 corresponding an intent represented by the command, etc.

The method 200 may include processing (230) the input to determine command data. The command data may be, for example, NLU results data including an intent and/or one or more entities. In some implementations, the command data may include additional data such as a data representing a plan for executing the command (e.g., identifying a skill for executing the command and/or a particular virtual assistant to be associated with execution of the command).

The method 200 may include determining (at a decision block 240) whether the device 110 is capable of processing the input. The determination may be performed, for example, by the arbitration component 160. The determination may be based on, for example, the one or more device-specific characteristics determined at the stage 220 and/or intents, entities, and/or other information determined from processing the input at the stage 230. If the arbitration component 160 determines that the device 110 is capable of processing the command ("Yes" at the decision block 240), the arbitration component 160 may indicate (250) to the system 120 that it should suspend processing. If the arbitration component 160 determines that the device 110 is not capable of processing the command ("No" at the decision block 240), the arbitration component 160 may indicate (260) that the system 120 should execute the command.

In some implementations, the arbitration component 160 may base its determination on policy data. The policy data may associate device-specific characteristics and/or command data with an execution decision. An execution decision may indicate, for example, whether to proceed with processing on the device 110 and/or the system 120. The policy data may identify a certain execution decision for a particular combination of device-specific characteristics and/or command data. The arbitration component 160 may base its prediction of device 110 behavior and/or its determination of an execution decision in part on one or more policies in the policy data.

In some implementations, the arbitration component 160 may output additional types of execution decisions; for example, and without limitation, system only, system first, device only, device first, any, device decides, etc. A system-only execution decision may indicate, for example, that the device 110 may not be able to process the input and/or execute the command, or that the system 120 may have exclusive execution rights (e.g., because the command includes an operation to be performed by a skill component 190 that may receive requests from the system 120 but not the device 110). A system-first execution decision may indicate that the system 120 may attempt to execute immediately, but the device 110 may execute if it does not receive a response from the system 120 within a given timeframe or if the device 110 goes offline (e.g., loses connectivity with the network 199) before receiving a response from the system 120. A device-only execution decision may indicate that the device 110 may execute but the system 120 may not; however, if the system 120 receives an indication from the device 110 that device 110 execution has failed, the system 120 may resume execution. A device-first execution decision may indicate that the device 110 may execute first, but the system 120 may execute if it does not receive an indication of successful execution from the device 110 within a given timeframe. An "any" execution decision indicates that both the device 110 and/or the system 120 may begin processing the input and executing the command without delay. The first response received by the device 110 (e.g., at the application 130) will win, and subsequent responses may be ignored. The "any" execution decision may be appropriate for commands where duplicate execution is not a concern, either because duplicate responses can be ignored or because they would not affect the outcome of the command execution. A device-decides execution decision may indicate a situation in which both the device 110 and the system 120 can respond with possible answers, but the device 110 may determine with which answer to execute the command; for example, when using a communication app where the device 110 and the system 120 maintain separate contact lists for the user for privacy purposes. In such cases, both the device 110 and the system 120 may determine potential entities (e.g., contacts), and the device 110 may determine which contact to communicate with. The arbitration component 160 may determine the execution decision based on the policy data.

Returning to the decision block 240, if the arbitration component 160 determines that the device 110 is not capable of processing the command ("No" at the decision block 240), the arbitration component 160 may indicate (260) that the system 120 should execute the command. The system 120 may execute the command by, for example, sending a request for processing to a skill component 190. The skill component 190 may generate a response and return it to the system 120. The method 200 may include sending (270) the response to the device. The response may be a message, such as a natural language output that may be converted to synthesized speech and output audibly. The response may be a directive to the device 110 describing an action to be performed in the physical world; e.g., adjusting volume of a music player, dimming a light, etc.

Returning to the decision block 240, if the arbitration component 160 determines that the device 110 is capable of processing the command ("Yes" at the decision block 240), the arbitration component 160 may indicate (250) to the system 120 that it should suspend processing. In some cases, however, the device 110 may be unable to process the input and/or execute the command. The device 110 may send the system 120 an indication that command execution has failed. The method 200 may include determining (at a decision block 280) that device processing has failed. If the system 120 receives an indication that device execution has failed ("Yes" at the decision block 280) the method 200 may include proceeding to the stage 260 and processing the command at the system 120. If the system 120 does not an indication that device execution has failed ("No" at the decision block 280) the method 200 may continue suspending processing.

Although the FIG. 2 illustrates certain stages/steps in a particular order, the steps described may be performed in a different order and/or during overlapping time periods (as well as certain steps removed or added) without departing from the present disclosure.

FIG. 3 is a conceptual diagram of components of the system 100, according to embodiments of the present disclosure. The system 120 may include the arbitration component 160, the speech processing components 150, and the skill components 190 previously described. The system 120 may include additional components for use with the arbitration component 160. For example, the arbitration component 160 may leverage one or more of a policy data component 165, an arbitration monitor component 170, and/or a device skill data component 175.

The policy data component 165 can include information storage for documents, tables, databases, and/or models and the like for storing policy data related to arbitrating command processing between the device 110 and the system 120. The policy data may associate device-specific characteristics, domains, intents, and/or entities with various execution decisions for device vs. system processing. For example, for an input received from a device 110 having a certain device identifier, the system 120 may determine one or more device-specific characteristics such as hardware and/or software capabilities of the device including, for example and without limitation, a device type, model, and/or version; an operating system type or version; hardware features of the device such as the presence of a camera or screen; installed apps; connected devices such as smart home devices and/or appliances; skills installed; virtual assistants available or enabled for use on the device; speech processing and/or speech generation models installed, etc. When the system 120 processes the input, it may determine command data including one or more of a domain, intent, one or more entities, and/or one or more skill components 190 that may execute a command corresponding to the intent, etc. The policy data may identify a certain execution decision for a particular combination of device-specific characteristics and/or command data. The arbitration component 160 may base its prediction of device 110 behavior and/or its determination of execution decision in part on one or more policies maintained in the policy data component 165.

In some implementations, the policy data can be learned/trained by observing a dataset of including device-specific characteristics, command data, and outcome data representing how a command represented in the input was executed and/or whether or not execution was successful. In some implementations, policy data may include policies authored and entered manually (e.g., encoded according to a predetermined format and/or generated using a software-based authoring tool).

In some implementations, the system 120 may include an arbitration monitor component 170 that can receive outcome data and determine whether a chosen execution decision matched the ultimate command execution. The arbitration monitor component 170 may identify where command execution diverges from a determined execution decision, and modify and/or add one or more policies; for example, to indicate a potential inability of the device 110 to execute a particular command. The arbitration component 160 may determine future execution decisions more accurately based on the updated policy data in the policy data component 165.

In some implementations, the system 120 may include a device skill data component. The device skill data component 175 may include device skill data regarding which device skill components 180 are available/enabled for a given device. The device skill data may further include more granular information about the capabilities of the device skill components 180; for example, which intents and/or entities may be valid for a device skill component 180. The device skill data component 175 may update its knowledge of device skill data by occasionally or periodically polling a device for a list of available device skill components 180. The device skill data component 175 may update its knowledge of device skill data by occasionally or periodically polling individual device skill components 180 available on the device to determine whether they are capable of, for example, fulfilling certain requests. In some implementations, the device skill data component 175 may act as a proxy for the device skill components 180. For example, the system 120 may be able to send requests to the device skill data component 175 asking whether a certain intent can be fulfilled. The device skill data component 175 may respond to the request in a manner similar to the skill components 190; for example, by receiving, parsing, and responding to the same types of informational requests from, for example, the orchestrator component 330. This operation may mirror operations on a device 110 where a device arbitration component 140 (described below with reference to FIG. 4) sends a request to a device skill component 180 to determine whether the skill may execute with respect to particular command data.

Operations of the system 120 may begin when the device 110 detects a wakeword or receives some other input data such as text data 313, image data 321, a button press indicating an invocation of a virtual assistant, etc. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 320. The wakeword detection component 320 may be configured to detect various wakewords. In at least some examples, each wakeword may correspond to a name of a different digital assistant. An example wakeword/digital assistant name is "Alexa." In another example, input to the system may be in form of text data 313, for example as a result of a user typing an input into a user interface of device 110. Other input forms may include indication that the user has pressed a physical or virtual button on device 110, the user has made a gesture, etc. The device 110 may also capture images using camera(s) 1218 of the device 110 and may send image data 321 representing those image(s) to the system 120. The image data 321 may include raw image data or image data processed by the device 110 before sending to the system 120.

The wakeword detection component 320 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 320 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 320 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 320 and/or input is detected by an input detector, the device 110 may "wake" and begin transmitting audio data 311, representing the audio 11, to the system(s) 120. The audio data 311 may include data corresponding to the wakeword; in other embodiments, the portion of the audio corresponding to the wakeword is removed by the device 110 prior to sending the audio data 311 to the system(s) 120. In the case of touch input detection or gesture based input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detection component 320 may result in sending audio data to system 120a for processing while detection of the wakeword "Computer" by the wakeword detector may result in sending audio data to system 120b for processing. The system may have a separate wakeword and system for different skills/systems (e.g., "Dungeon Master" for a game play skill/system 120c) and/or such skills/systems may be coordinated by one or more skill(s) 190 of one or more systems 120.

Upon receipt by the system(s) 120, the audio data 311 may be sent to an orchestrator component 330. The orchestrator component 330 may include memory and logic that enables the orchestrator component 330 to transmit various pieces and forms of data to various components of the system, as well as perform other operations as described herein.

The orchestrator component 330 may send the audio data 311 to the system speech processing components 150. The system speech processing components 150 may include language processing components 392 for recognizing and understanding natural language, and/or language output components 393 for generating natural language and/or synthetic speech. The language processing component 392 (sometimes also referred to as a spoken language understanding (SLU) component) includes an automatic speech recognition (ASR) component 350 and a natural language understanding (NLU) component 360. The ASR component 350 may transcribe the audio data 311 into text data. The text data output by the ASR component 350 represents one or more than one (e.g., in the form of an N-best list) ASR hypotheses representing speech represented in the audio data 311. The ASR component 350 interprets the speech in the audio data 311 based on a similarity between the audio data 311 and pre-established language models. For example, the ASR component 350 may compare the audio data 311 with models for sounds (e.g., acoustic units such as phonemes, senons, phones, etc.) and sequences of sounds to identify words that match the sequence of sounds of the speech represented in the audio data 311. The ASR component 350 sends the text data generated thereby to an NLU component 360, via, in some embodiments, the orchestrator component 330. The text data sent from the ASR component 350 to the NLU component 360 may include a single top-scoring ASR hypothesis or may include an N-best list including multiple top-scoring ASR hypotheses. An N-best list may additionally include a respective score associated with each ASR hypothesis represented therein. The ASR component 350 is described in greater detail below with regard to FIG. 3.

The speech processing system 392 may further include a NLU component 360. The NLU component 360 may receive the text data from the ASR component. The NLU component 360 may attempts to make a semantic interpretation of the phrase(s) or statement(s) represented in the text data input therein by determining one or more meanings associated with the phrase(s) or statement(s) represented in the text data. The NLU component 360 may determine an intent representing an action that a user desires be performed and may determine information that allows a device (e.g., the device 110, the system(s) 120, a skill component 190, a skill support system(s) 325, etc.) to execute the intent. For example, if the text data corresponds to "play the 5$^{th}$ Symphony by Beethoven," the NLU component 360 may determine an intent that the system output music and may identify "Beethoven" as an artist/composer and "5th Symphony" as the piece of music to be played. For further example, if the text data corresponds to "what is the weather," the NLU component 360 may determine an intent that the system output weather information associated with a geographic location of the device 110. In another example, if the text data corresponds to "turn off the lights," the NLU component 360 may determine an intent that the system turn off lights associated with the device 110 or the user 5. However, if the NLU component 360 is unable to resolve the entity—for example, because the entity is referred to by anaphora such as "this song" or "my next appointment"—the speech processing system 392 can send a decode request to another speech processing system 392 for information regarding the entity mention and/or other context related to the utterance. The speech processing system 392 may augment, correct, or base results data upon the audio data 311 as well as any data received from the other speech processing system 392.

The NLU component 360 may return NLU results data (which may include tagged text data, indicators of intent, etc.) back to the orchestrator component 330. The orchestrator component 330 may forward the NLU results data to a skill component(s) 190. If the NLU results data includes a single NLU hypothesis, the NLU component 360 and the orchestrator component 330 may direct the NLU results data to the skill component(s) 190 associated with the NLU hypothesis. If the NLU results data includes an N-best list of NLU hypotheses, the NLU component 360 and the orchestrator component 330 may direct the top scoring NLU hypothesis to a skill component(s) 190 associated with the top scoring NLU hypothesis. The system may also include a post-NLU ranker which may incorporate other information to rank potential interpretations determined by the NLU component 360. The device 110 may also include its own post-NLU ranker, which may operate similarly to the post-NLU ranker of the system 120.

A skill component may be software running on the system(s) 120 that is akin to a software application. That is, a skill component 190 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 190. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pi8 with respect to the restaurant's online ordering system, etc. A skill component 190 may operate in conjunction between the system(s) 120 and other devices, such as the device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill support system(s) 325 may communicate with a skill component(s) 190 within the system(s) 120 and/or directly with the orchestrator component 330 or with other components. A skill support system(s) 325 may be configured to perform one or more actions. An ability to perform such action(s) may sometimes be referred to as a "skill." That is, a skill may enable a skill support system(s) 325 to execute specific functionality in order to provide data or perform some other action requested by a user. For example, a weather service skill may enable a skill support system(s) 325 to provide weather information to the system(s) 120, a car service skill may enable a skill support system(s) 325 to book a trip with respect to a taxi or ride sharing service, an order pi8 skill may enable a skill support system(s) 325 to order a pi8 with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 190 dedicated to interacting with the skill support system(s) 325. Unless expressly stated otherwise, reference to a skill, skill device, or skill component may include a skill component 190 operated by the system(s) 120 and/or skill operated by the skill support system(s) 325. Moreover, the functionality described herein as a skill or skill may be referred to using many different terms, such as an action, bot, app, or the like. The skill 190 and or skill support system(s) 325 may return output data to the orchestrator component 330.

The system 120 includes language output components 393. The language output components 393 includes a natural language generation (NLG) component 379 and a text-to-speech (TTS) component 380. The NLG component 379 can generate text for purposes of TTS output to a user. For example the NLG component 379 may generate text corresponding to instructions corresponding to a particular action for the user to perform. The NLG component 379 may generate appropriate text for various outputs as described herein. The NLG component 379 may include one or more trained models configured to output text appropriate for a particular input. The text output by the NLG component 379 may become input for the TTS component 380 (e.g., output text data discussed below). Alternatively or in addition, the TTS component 380 may receive text data from a skill 190 or other system component for output.

The NLG component 379 may include a trained model. The NLG component 379 generates text data from dialog data received by the dialog manager such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 380.

The TTS component 380 may generate audio data (e.g., synthesized speech) from text data using one or more different methods. Text data input to the TTS component 380 may come from a skill component 190, the orchestrator component 330, or another component of the system. In one method of synthesis called unit selection, the TTS component 380 matches text data against a database of recorded speech. The TTS component 380 selects matching units of recorded speech and concatenates the units together to form audio data. In another method of synthesis called parametric synthesis, the TTS component 380 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system(s) 120 as image data. The device 110 may further include circuitry for voice command-based control of the camera, allowing a user 5 to request capture of image or video data. The device 110 may process the commands on-device or send audio data 311 representing the commands to the system(s) 120 for processing, after which the system(s) 120 may return output data that can cause the device 110 to engage its camera.

Upon receipt by the system(s) 120, the image data 321 may be sent to an orchestrator component 330. The orchestrator component 330 may send the image data 321 to an image processing component. The image processing component can perform computer vision functions such as object recognition, modeling, reconstruction, etc. For example, the image processing component may detect a person, face, etc. The device may also include an image processing component which operates similarly to image processing component.

In some implementations, the image processing component can detect the presence of text in an image. In such implementations, the image processing component can recognize the presence of text, convert the image data to text data, and send the resulting text data via the orchestrator component 330 to the language processing component 392 for processing by the NLU component 360.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 370 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 370 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 370 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

FIG. 4 is a conceptual diagram illustrating components that may be included in a device 110, according to embodiments of the present disclosure. The device 110 may include the application 130, the device speech processing components 135, and the device skill components 180 previously described. The device 110 may include additional components including a device arbitration component 140 and a policy data component 145.

The device arbitration component 140 and the policy data component 145 may operate similarly to the arbitration component 160 and the policy data component 165, respectively, on the system 120. The device arbitration component 140 may use the policy data in the policy data component 145 to make a rule-based execution decision determination. The policy data component 145 may receive occasional or periodic updates of policy data from the system 120. The policy data may then stay consistent (or nearly consistent) between the policy data component 145 on the device 110 and the policy data component 165 on the system 120. This may enable the device arbitration component 140 to make the same execution decision determination as the arbitration component 160 when based on the same device-specific characteristics and command data. Furthermore, if respective execution decisions between the device arbitration component 140 and the arbitration component 160 diverge, the arbitration monitor component 170 may update the policy data in the policy data component 165 and, by extension, the policy data component 145.

In at least some embodiments, the system 120 may receive the audio data 311 from the device 110, to recognize speech corresponding to a spoken input in the received audio data 311, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 480) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 3, the device 110 may include a wakeword detection component 320 configured to compare the audio data 311 to stored models used to detect a wakeword (e.g., "Alexa") that indicates to the device 110 that the audio data 311 is to be processed for determining NLU output data (e.g., slot data that corresponds to a named entity, label data, and/or intent data, etc.). In at least some embodiments, a hybrid selector 424, of the device 110, may send the audio data 311 to the wakeword detection component 320. If the wakeword detection component 320 detects a wakeword in the audio data 311, the wakeword detection component 320 may send an indication of such detection to the hybrid selector 424. In response to receiving the indication, the hybrid selector 424 may send the audio data 311 to the system 120 and/or the ASR component 450. The wakeword detection component 320 may also send an indication, to the hybrid selector 424, representing a wakeword was not detected. In response to receiving such an indication, the hybrid selector 424 may refrain from sending the audio data 311 to the system 120, and may prevent the ASR component 450 from further processing the audio data 311. In this situation, the audio data 311 can be discarded.

The device 110 may conduct its own speech processing using the device speech processing components 135, such as an SLU/language processing component 492 (which may include an ASR component 450 and an NLU 460), similar to the manner discussed herein with respect to the SLU component 392 (or ASR component 350 and the NLU component 360) of the system 120. Language processing component 492 may operate similarly to language processing component 392, ASR component 450 may operate similarly to ASR component 350 and NLU component 460 may operate similarly to NLU component 360. The device 110 may also internally include, or otherwise have access to, other components such as one or more skill components 180 capable of executing commands based on NLU output data or other results determined by the device 110/system 120 (which may operate similarly to skill components 190). Similar to as described above with respect to skill component 190, a skill component 180 may communicate with a skill support system(s) 325. The device speech processing components 135 may further include language output component 493 which may include NLG component 479 and TTS component 480. Language output component 493 may operate similarly to the language output components 393, NLG component 479 may operate similarly to NLG component 379 and TTS component 480 may operate similarly to TTS component 380.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 424, of the device 110, may include a hybrid proxy (HP) 426 configured to proxy traffic to/from the system 120. For example, the HP 426 may be configured to send messages to/from a hybrid execution controller (HEC) 427 of the hybrid selector 424. For example, command/directive data received from the system 120 can be sent to the HEC 427 using the HP 426. The HP 426 may also be configured to allow the audio data 311 to pass to the system 120 while also receiving (e.g., intercepting) this audio data 311 and sending the audio data 311 to the HEC 427.

In at least some embodiments, the hybrid selector 424 may further include a local request orchestrator (LRO) 428 configured to notify the ASR component 450 about the availability of new audio data 311 that represents user speech, and to otherwise initiate the operations of on-device language processing when new audio data 311 becomes available. In general, the hybrid selector 424 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 311 is received, the HP 426 may allow the audio data 311 to pass through to the system 120 and the HP 426 may also input the audio data 311 to the on-device ASR component 450 by routing the audio data 311 through the HEC 427 of the hybrid selector 424, whereby the LRO 428 notifies the ASR component 450 of the audio data 311. At this point, the hybrid selector 424 may wait for response data from either or both of the system 120 or the on-device language processing components. However, the disclosure is not limited thereto, and in some examples the hybrid selector 424 may send the audio data 311 only to the on-device ASR component 450 without departing from the disclosure. For example, the device 110 may process the audio data 311 on-device without sending the audio data 311 to the system 120.

The on-device ASR component 450 is configured to receive the audio data 311 from the hybrid selector 424, and to recognize speech in the audio data 311, and the on-device NLU component 460 is configured to determine a user intent from the recognized speech, and to determine how to act on the user intent by generating NLU output data which may include directive data (e.g., instructing a component to perform an action). Such NLU output data may take a form similar to that as determined by the NLU component 360 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 460) may be selected as usable to respond to a natural language user input, and local response data may be sent (e.g., on-device NLU output data, local knowledge base information, internet search results, and/or local directive data) to the hybrid selector 424, such as a "ReadyToExecute" response. The hybrid selector 424 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 311 to the system 120, and the response data from the system 120 may include the unique identifier to identify which natural language user input the response data corresponds.

In at least some embodiments, the device 110 may include, or be configured to use, one or more skill components 180 that may work similarly to the skill component(s) 190 implemented by the system 120. The skill component(s) 180 may correspond to one or more domains that are used in order to determine how to act on a spoken input in a particular way, such as by outputting a directive that corresponds to the determined intent, and which can be processed to implement the desired operation. The skill component(s) 180 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill support systems 325. For example, a skill support system 325 may be located in a remote environment (e.g., separate location) such that the device 110 may only communicate with the skill support system 325 via the network(s) 199. However, the disclosure is not limited thereto. For example, in at least some embodiments, a skill support system 325 may be configured in a local environment (e.g., home server and/or the like) such that the device 110 may communicate with the skill support system 325 via a private network, such as a local area network (LAN).

As used herein, a "skill" may refer to a skill component 180, a skill support system 325, or a combination of a skill component 180 and a corresponding skill support system 325. Similar to the manner discussed with regard to FIG. 3, the device 110 may be configured to recognize multiple different wakewords and/or perform different categories of tasks depending on the wakeword. Such different wakewords may invoke different processing components of the device 110 (not illustrated in FIG. 4). For example, detection of the wakeword "Alexa" by the wakeword detection component 320 may result in sending audio data to certain language processing components 492/skills 180 for processing while detection of the wakeword "Computer" by the wakeword detector may result in sending the audio data to different language processing components 492/skills 180 for processing.

The device 110 may include profile storage 470 for storing a variety of information related to individual users, groups of users, devices, etc. that interact with the system. The profile storage 470 may be similar to, for example, the profile storage 370 of the system 120, but perhaps storing a subset of profiles registered with and/or relevant to the device 110.

FIG. 5 is a conceptual diagram illustrating example components of a system for determining an execution decision at the system 120 and on the device 110, according to embodiments of the present disclosure. Both the device 110 and the system 120 may include an arbitration component 140 and 160, respectively, using synched policy data to render execution decisions. In many cases, the execution decisions may be consistent; for example, both the device arbitration component 140 and the arbitration component 160 will provide the same execution decision based on the same device-specific characteristics and command data. There may be situations in which ASR and/or NLU results from the device speech processing components 135 differ from those of the system speech processing components 150; however, this may represent a small subset of possible device-specific characteristics and command data combination, and careful curation of the policy data may result in similar ASR/NLU results being associated with the same execution decisions to reduce the frequency of minor differences in interpretation leading to conflicting execution decisions. Furthermore, the arbitration monitor component 170 can provide an automatic feedback mechanism to update policy data based on discrepancies between execution decisions and outcome data.

Figure 6:
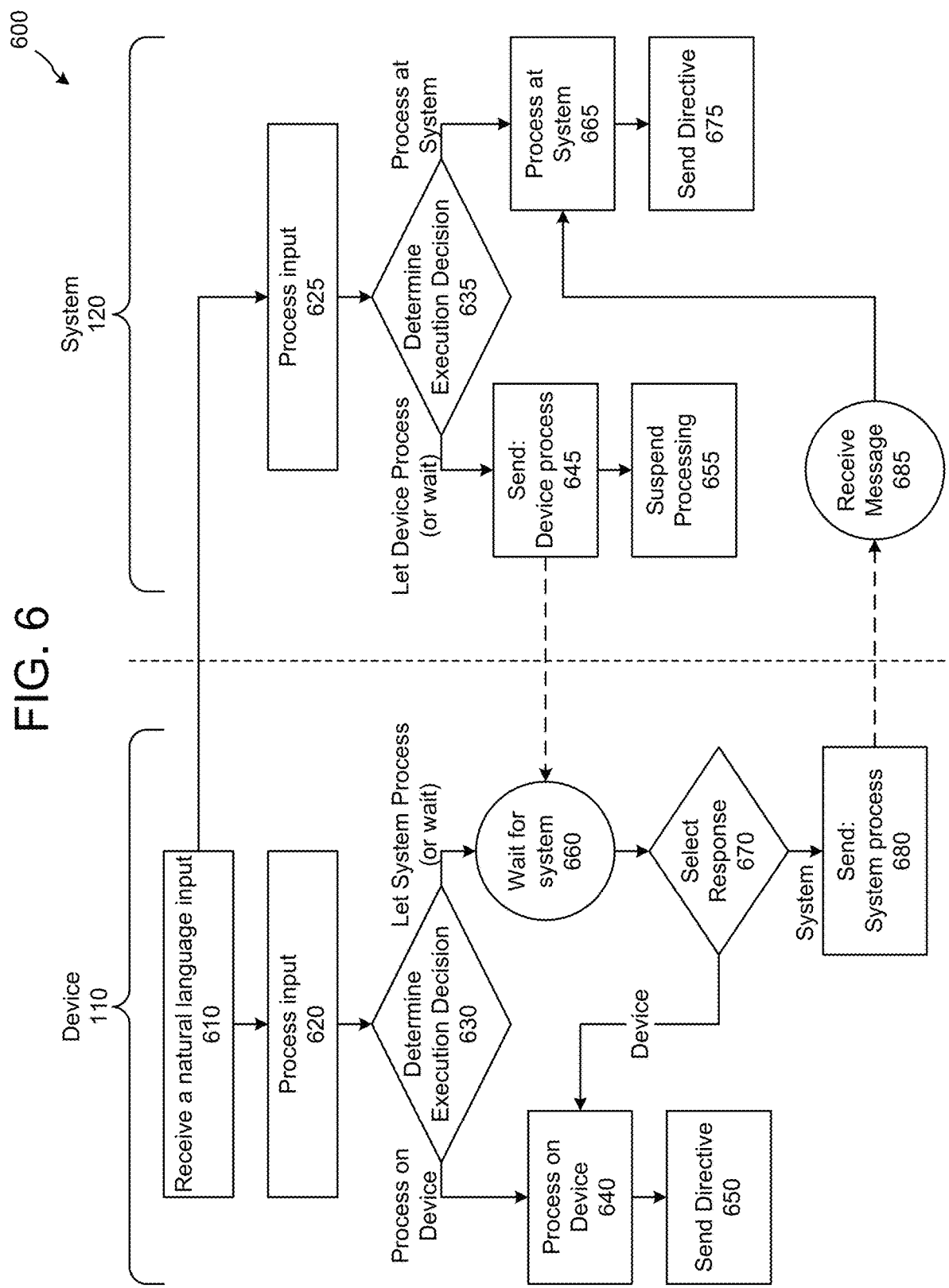
FIG. 6 is a flowchart illustrating example operations of a method of determining an execution decision at the other system and on the device, according to embodiments of the present disclosure.

As described previously, the device 110 may include an application 130 that may receive input 112 from the user 5 and return output 113. The device may further include the device speech processing component 135, the device arbitration component 140, the policy data component 145, and the device skill components 180. The system 120 may include the system speech processing components 150, the arbitration component 160, the device skill data component 175, the policy data component 165, the arbitration monitor component 170, and the skill components 190. FIG. 6 illustrates example operations of the system 100 as shown in FIG. 5.

FIG. 6 is a flowchart illustrating example operations of a method 600 of determining an execution decision at the system 120 and on the device 110, according to embodiments of the present disclosure. The method 600 may include determining execution decisions both on the device 110 and the system 120, and attempting to process the input based on the determined execution decisions. The method 600 may include receiving (610) input data representing a natural language input at the device 110 and sending it to the system 120. The method 600 may include processing (620) the input data on the device 110 to determine command data. The method 600 may include determining (at a decision block 630) an execution decision. The device 110 may determine an execution decision by checking policy data for a policy associated with the one or more device-specific characteristics and/or the command data. The execution decision may be, for example and without limitation, system only, system first, device offline, device only, device first, and/or any. If the method 600 determines an execution decision that involves immediate processing on the device ("Process on Device" at the decision block 630), the method 600 may proceed to processing (640) the command data on the device 110. Example execution decisions involving immediate processing on the device 110 may include, for example, device offline, device only, device first, and/or "any." Following the processing at the stage 640, the device 110 may send (650) a directive to the application 130 for performing an action and/or generating an output.

If the method 600 determines an execution decision that involves system 120 only or system 120 first processing ("Let System Process (or wait)" at the decision block 630), the method 600 may proceed to waiting (660) for a directive from the system. Example execution decisions involving system-only or system-first processing may include, for example, system only, system first, and/or device decides. If the device 110 receives a directive from the system 120, the method 600 may include selecting (at a decision block 670) a response based on the directive. If the directive indicates on-device processing ("Let Device Process (or wait)" at the decision block 670), the method 600 may proceed to the stage 640 to process the command on the device 110. If the directive indicates system processing ("Process at System" at the decision block 670), the method 600 may include sending (680) a directive back to the system 120 an acknowledgement that the system 120 is to process the command. The system 120 may receive (685) the message and proceed with processing the command.

At the system 120, the method 600 may include processing (625) the input data to determine command data. The system 120 may also receive (or have stored) device specific characteristics regarding the device 110. The method may include determining (at a decision block 635) an execution decision; e.g., based on the device-specific characteristics and the command data. If the execution decision indicates the device 110 should handle the request first or exclusively ("Let Device Process (or wait)" at the decision block 635) (e.g., device-first or device-only execution decisions), the method may include sending (645) a directive to the device 110 indicating that the device should proceed with processing the input data. The method 600 may include suspending (655) processing unless and until the system 120 receives an indication/directive from the device 110 indicating that device processing has failed and/or that the system 120 should execute the command. The system 120 may temporarily store the command data and/or an execution plan in the event the system 120 is to resume processing; e.g., by receiving a message at the stage 685.

If the execution decision involves immediate processing the system 120 ("Process at System" at the decision block 635) (e.g., system only, system first, or "any" execution decisions), the method may include processing (665) the input data at the system 120. The method 600 may include sending (675) a directive and/or other response based on processing the input to the device 110 for output or to perform some other action. Although the FIG. 6 illustrates certain stages/steps in a particular order, the steps described may be performed in a different order and/or during overlapping time periods (as well as certain steps removed or added) without departing from the present disclosure. FIG. 7 through FIG. 11, described below, show example operations of the system 100 for various execution decisions as determined by the device 110 and the system 120.

Figure 7:
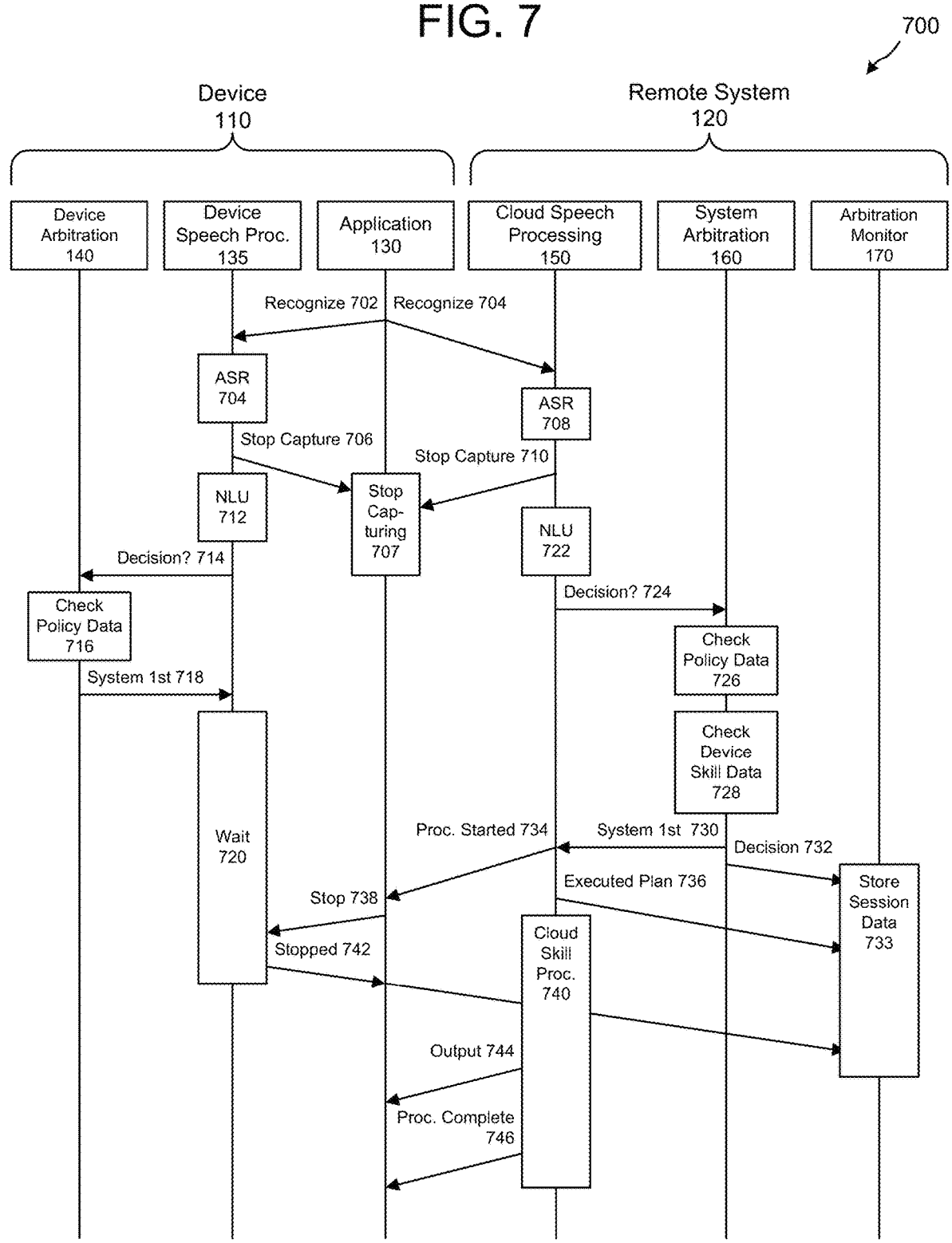
FIG. 7 is a signal flow diagram of example operations illustrating a scenario in which the other system executes within an expected time, according to embodiments of the present disclosure.

FIG. 7 is a signal flow diagram of example operations 700 illustrating a scenario in which the system executes within an expected time, according to embodiments of the present disclosure. In FIG. 7, both the device arbitration component 140 and the system arbitration component 160 determine the same execution decision (system first). The device 110 may be ready to execute the command first, but may wait for the system 120 up until a timeout period has elapsed before it can execute the command. The system 120 may respond within the timeout period by sending a request-processing-started directive to the device 110 to indicate that the system 120 has determined command data and sent it to a skill component 190 for execution. The device 110 may thus halt processing and discard its execution plan. The device 110 may, however, send its discarded execution plan in the form of outcome data to the system 120 for processing by the arbitration monitor component 170. The arbitration monitor component 170 may compare the outcome data to the execution plan determined by the system 120.

The operations 700 may begin with the application 130 receiving an indication to capture audio and generate audio data. On the device 110 side, the operations 700 may include sending (702) the audio data to the device speech processing components 135 for ASR (704) and NLU (712) processing to determine command data. The ASR processing may indicate an EOU and send (706) a stop capture directive back to the application 130. The device may stop (707) capturing audio received at the microphone. The device speech processing components 135 may send (714) the command data and/or one or more device-specific characteristics to the device arbitration component 140. The device arbitration component 140 may check (716) policy data to determine an execution decision. The device arbitration component 140 may send (718) the determined execution decision back to the device speech processing components 135.

On the system 120 side, the operations 700 may include sending (704) the audio data to the system speech processing components 150 for ASR (708) and NLU (722) processing to determine command data. The ASR processing may indicate an EOU and send (710) a stop capture directive back to the application 130. The system speech processing components 150 may send (724) the command data and/or one or more device-specific characteristics to the system arbitration component 160. The system arbitration component 160 may check (726) policy data to determine an execution decision. In some implementations, the system arbitration component 160 may additionally or alternatively check (728) device skill data to determine one or more capabilities of one or more device skill components 180. Based on the policy data and/or the skill data, the system arbitration component 160 may send (730) the determined execution decision back to the system speech processing components 150. The system arbitration component 160 may also send (732) the determined execution decision to the arbitration monitor component 170. The arbitration monitor component 170 may store (733) data including the execution decision, plan data, and/or outcome data for the session.

In FIG. 7, the device arbitration component 140 and the system arbitration component 160 both determine a system-first execution decision. Upon receiving the execution decision from the device arbitration component 140, the device speech processing component 135 may wait (720) by halting on-device processing of the command data for a timeout period. If the timeout period expires prior to receiving a response from the system 120, the device 110 may attempt to resume processing. In this case, however, the system 120 sends (734) a request-processing-started directive to the device 110, and the application 130 directs (738) the device 110 to abort processing. The device 110 may send (742) a message to the system 120, possibly accompanied by the aborted execution plan, to the system 120 for processing by the arbitration monitor component 170.

The system speech processing components 150, upon receiving the system-first execution decision at the step 730, may prepare and send (736) an execution plan to the arbitration monitor component 170 for processing. The system 120 may process (740) the command by, for example, sending a request to a skill component 190. The skill component 190 may return an output which the system 120 may send (744) a response to the device 110 to output as synthesized speech or to perform as some other action. The system 120 may then send (746) a request-processing-complete directive to the device 110 to indicate that processing of the input data is complete.

Thus, the input data may be processed by the system 100 without duplication or extra delays.

Figure 8:
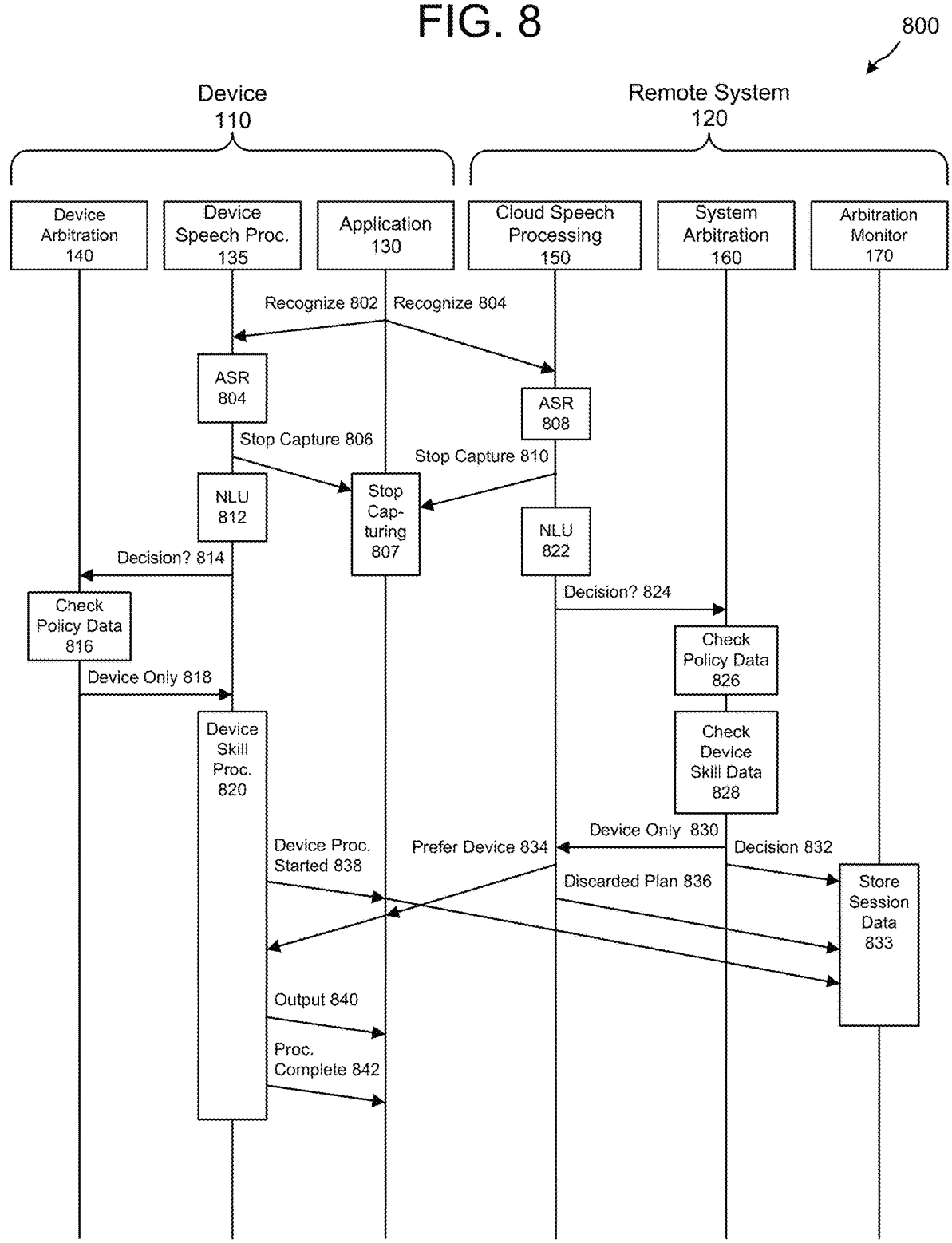
FIG. 8 is a signal flow diagram of example operations illustrating a scenario in which the device executes and the system suspends processing, according to embodiments of the present disclosure.

FIG. 8 is a signal flow diagram of example operations 800 illustrating a scenario in which the device executes and the system suspends processing, according to embodiments of the present disclosure. Once again, the device arbitration component 140 and the system arbitration component 160 return the same execution decision; in this case a device-only execution decision. The system 120 may suspend processing in favor of device 110 processing, and report its execution decision and discarded execution plan to the arbitration monitor component 170.

The operations 800 on the device 110 side up to the step 818, and the operations 800 on the system side up to the step 830 may be similar to the corresponding steps of the operations 700. In this case, the device arbitration component 140 and the system arbitration component 160 both return a device-only execution decision. On the system 120 side, the operations 800 may include the system arbitration component 160 sending (832) the determined execution decision to the arbitration monitor component 170. The arbitration monitor component 170 may store (833) data including the execution decision, plan data, and/or outcome data for the session. The system speech processing components 150 may receive the execution decision and send (834) a directive to the device 110 indicating that device 110 processing is preferred. The system speech processing components 150 may send (836) the discarded execution plan to the arbitration monitor component 170.

On the device 110 side, the operations 800 may include requesting (820) execution of the command data by a device skill component 180. The device may send (838) a device-processing-started directive to the arbitration monitor component 170. The device skill component 180 may return (840) an output which the device 110 may output as synthesized speech or perform as some other action. The device speech processing components 135 may then send (842) a request-processing-complete directive to the application 130 to indicate that processing of the input data is complete. Again, the input data may be processed by the system 100 without duplication or extra delays.

Figure 9:
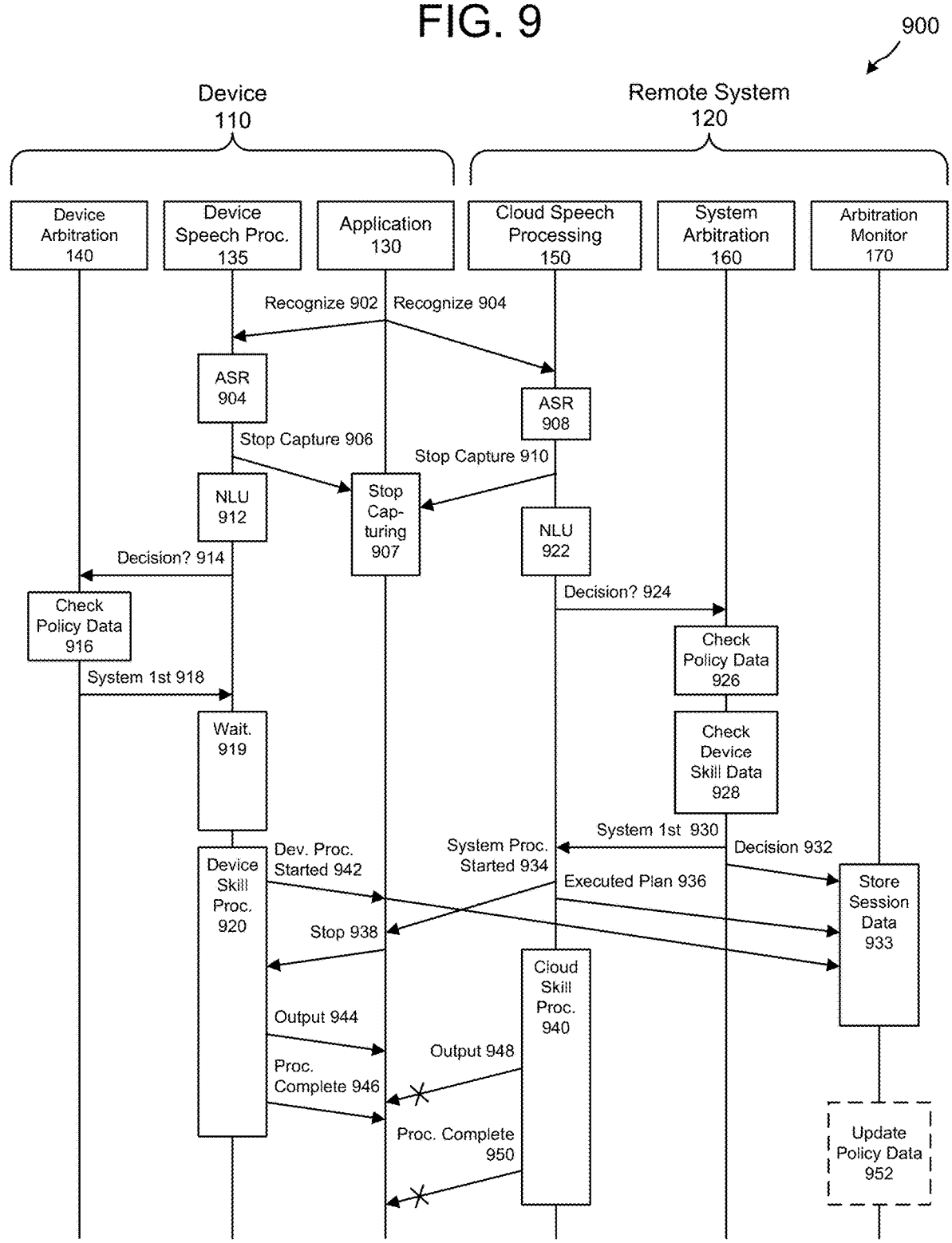
FIG. 9 is a signal flow diagram of example operations illustrating a scenario in which the other system is chosen to execute but does not respond within an expected time, according to embodiments of the present disclosure.

FIG. 9 is a signal flow diagram of example operations 900 illustrating a scenario in which the system is chosen to execute but does not respond within an expected time, according to embodiments of the present disclosure. The operations 900 represent a variation on the operations 700 in which both the device arbitration component 140 and the system arbitration component 160 determine a system-first execution decision; however, the system 120 response is delayed, causing the device 110 to time out and commence processing on-device. Command execution is duplicated, but the later-received directives are discarded. Assuming that both the device 110 and the system 120 agreed on the interpretation of the input data, the duplication may lead to no visible deviation in device 110 behavior. But any perceptible side effects caused without directives to the application 130 (for example, actions involving other devices) may not be intercepted and could cause the other device to exhibit unwanted behaviors. The arbitration monitor component 170 may receive the outcome data update policy data to trigger changes for subsequently received inputs.

The operations 900 on the device 110 side up to the step 918, and the operations 900 on the system side up to the step 930 may be similar to the corresponding steps of the operations 700. As in the operation 700, both the device arbitration component 140 and the system arbitration component 160 return a system-first execution decision. Upon receiving the execution decision from the device arbitration component 140, the device speech processing component 135 may wait (919) by halting on-device processing of the command data for a timeout period. If the timeout period expires prior to receiving a response from the system 120, the device 110 may attempt to resume processing. In this case, the device 110 does not receive a response from the system 120 prior to the timeout period, and thus requests (920) execution of the command data by a device skill component 180. The device 110 may send (942) a device-processing-started message to the arbitration monitor component 170 for processing. The device may receive (938) a directive from the system 120 to abort processing; however, having already commenced on-device processing at the step 920, the device 110 may not stop the device skill component 180 from processing the command data. The device skill component 180 may return (944) an output which the device 110 may output as synthesized speech or perform as some other action. The device speech processing components 135 may then send (946) a request-processing-complete directive to the application 130 to indicate that processing of the input data is complete.

On the system 120 side, the operations 900 may include the system arbitration component 160 sending (932) the determined execution decision to the arbitration monitor component 170. The arbitration monitor component 170 may store (933) data including the execution decision, plan data, and/or outcome data for the session. The arbitration monitor component 170 may use the session data to, for example, update policies related to arbitration. The operations 900 may include sending (934) a request-processing-started directive to the device 110. The application 130 may direct at the step 938 the device 110 to abort processing; however, as the device skill component 180 has already commenced execution, it may continue until complete. The system speech processing components 150 may send (936) the discarded execution plan to the arbitration monitor component 170. The system 120 may process (940) the command by, for example, sending a request to a skill component 190. The skill component 190 may return an output which the system 120 may send (948) a response to the device 110 to output as synthesized speech or to perform as some other action. The system 120 may then send (950) a request-processing-complete directive to the device 110 to indicate that processing of the input data is complete. The application 130 may, however, intercept both the response sent at the step 948 and the directive sent at the step 950, which, in some cases, may prevent duplicated outputs or actions by the device 110. The application 130 may not be able to intercept responses, output, and/or directives sent to other devices and/or components.

Figure 10:
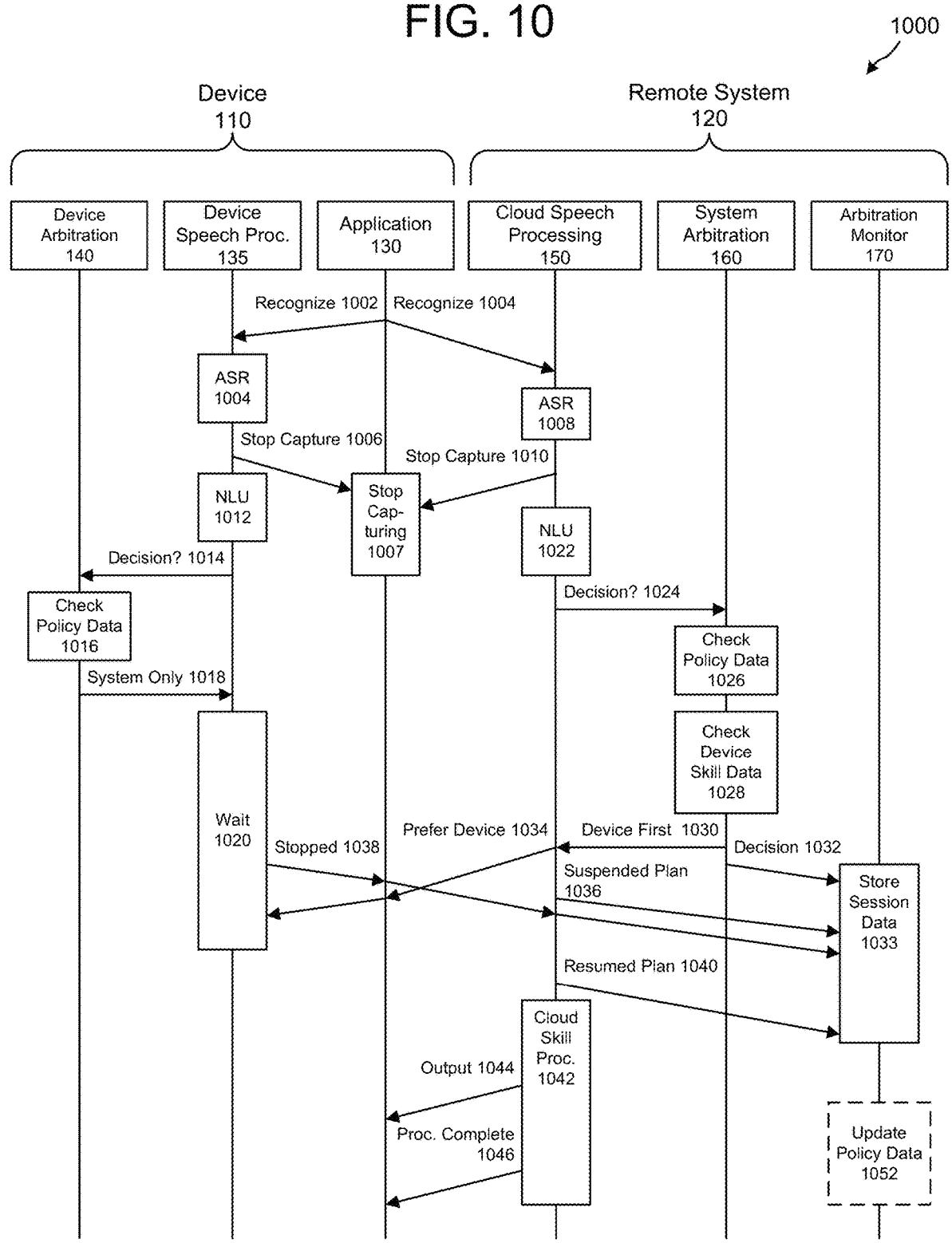
FIG. 10 is a signal flow diagram of example operations illustrating a scenario in which the device and other system execution decisions diverge, the other system suspends processing, but then resumes processing upon notification from the device, according to embodiments of the present disclosure.

The arbitration monitor component 170 may receive the execution decision from the system arbitration component 160, the execution plan from the system speech processing components 150, and/or outcome data from the device 110. The arbitration monitor component 170 may detect points where the outcome diverged from the execution decisions and/or plans. In some implementations, the arbitration monitor component 170, after detecting one or multiple such discrepancies, may update (952) the policy data with a modified and/or new policy. This may prevent or mitigate future discrepancies for similar combinations of device-specific characteristics, command data, and/or other characteristics of the system 100 such as network conditions FIG. 10 is a signal flow diagram of example operations 1000 illustrating a scenario in which the device and system execution decisions diverge, the system suspends processing, but then resumes processing upon notification from the device, according to embodiments of the present disclosure. In the operations 1000, the system arbitration component 160 determines a device-first execution decision, but the device arbitration component 140 determines a system-only execution decision. This may be because the device 110 fails to recognize/understand the input data, or because command data related to a selected interpretation of the input data is rejected by the device skill components 180. The system 120 suspends processing upon determining the device-first execution decision, but resumes processing after receiving a notification from the device 110 that device processing has been aborted. The time elapsed between suspending and resuming processing may result in latency for the user. However, the arbitration monitor component 170 may update the policy data such that in the future the system 120 may determine a different execution decision that better corresponds to the capabilities of the device.

The operations 1000 on the device 110 side up to the step 1018, and the operations 1000 on the system side up to the step 1030 may be similar to the corresponding steps of the operations 700. In this case, the device arbitration component 140 returns a system-only execution decision at the step 1018, and the system arbitration component 160 returns a device-first execution decision at the step 1030. Upon receiving the execution decision from the device arbitration component 140, the device speech processing component 135 may wait (1020) by halting on-device processing of the command data for a timeout period. If the timeout period expires prior to receiving a response from the system 120, the device 110 may attempt to resume processing. In this case, the system 120 sends (1034) to the device 110 a message that device processing is preferred; however, the device 110 cannot process the input data and/or cannot execute the command. Meanwhile, the device 110 may send (1038) a message to the system 120 and the arbitration monitor component 170 that device processing has been aborted. The message to the arbitration monitor component 170 may be accompanied by the aborted execution plan.

On the system 120 side, the operations 1000 may include the system arbitration component 160 sending (1032) the determined execution decision to the arbitration monitor component 170. The arbitration monitor component 170 may store (1033) data including the execution decision, plan data, and/or outcome data for the session. The arbitration monitor component 170 may use the session data to, for example, update policies related to arbitration. The system speech processing components 150 may receive the execution decision sent at the step 1030 and send, at the step 1034, the directive to the device 110 indicating that device 110 processing is preferred. The system speech processing components 150 may suspend (1036) the execution plan, and send the execution plan data to the arbitration monitor component 170.

The system 120 may, however, receive the device 110 abort processing message sent at the step 1038 and thus attempt to resume execution. The system speech processing components 150 may send (1040) the resumed execution plan to the arbitration monitor component 170. The system 120 may process (1042) the command by, for example, sending a request to a skill component 190. The skill component 190 may return an output which the system 120 may send (1044) a response to the device 110 to output as synthesized speech or to perform as some other action. The system 120 may then send (1046) a request-processing-complete directive to the device 110 to indicate that processing of the input data is complete.

The arbitration monitor component 170 may receive the execution decision from the system arbitration component 160, the execution plan from the system speech processing components 150, and/or outcome data from the device 110. The arbitration monitor component 170 may detect points where the outcome diverged from the execution decisions and/or plans. In some implementations, the arbitration monitor component 170, after detecting one or multiple such discrepancies, may update (1052) the policy data with a modified and/or new policy; for example, to indicate a potential inability of the first device to execute a command represented in the command data. This may prevent or mitigate future discrepancies for similar combinations of device-specific characteristics, command data, and/or other characteristics of the system 100 such as network conditions.

Figure 11:
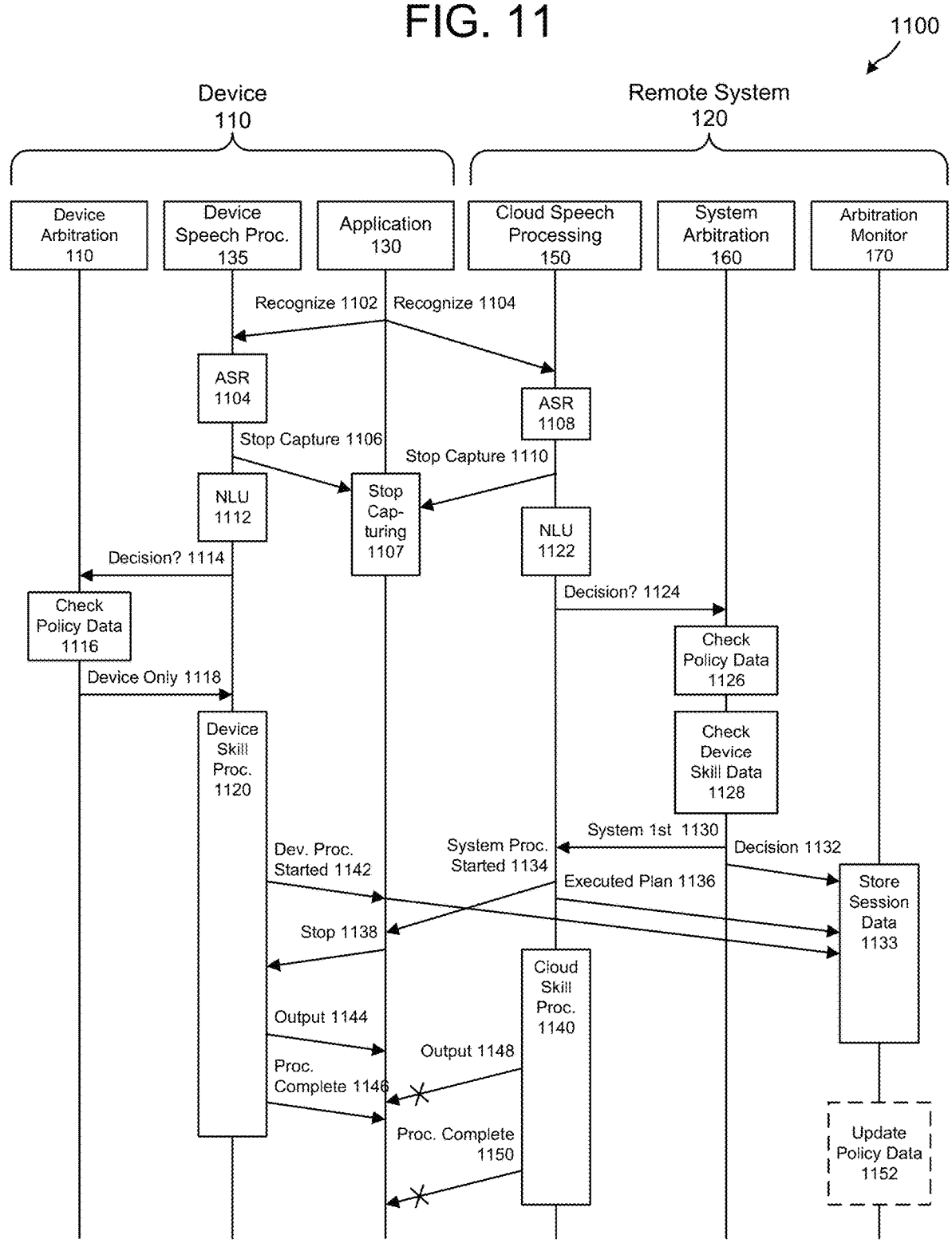
FIG. 11 is a signal flow diagram of example operations illustrating a scenario in which the device and other system execution decisions diverge, and both the device and the other system execute, according to embodiments of the present disclosure.

FIG. 11 is a signal flow diagram of example operations 1100 illustrating a scenario in which the device and system execution decisions diverge, and both the device and the system execute, according to embodiments of the present disclosure. The operations 1100 represent a variation of the timeout use case illustrated by the operations 900. The dataflow may be very similar to that described with reference to FIG. 9, but the possibility of errant system behaviors may be higher due to the respective arbitration components determining different execution decisions.

Most of the operations 1100 may similar to the corresponding operations 900 with the exception of the execution decision chosen at the step 1116 and omitting the timeout period at the step 919. In the operations 1100, the device arbitration component 140 determines a device-only execution decision. The device 110 thus forgoes the wait period and proceeds with the processing (1120) the command data using a device skill component 180. The system arbitration component 160 determines a system-first execution decision, and thus also proceeds with processing (1140) command data at a skill component 190. But a response sent (1148) from the system 120 as well as request-processing-complete directive sent (1150) from the system 120 may be ignored by the device 110. The arbitration monitor component 170, after detecting one or multiple discrepancies—for example, in session data stored at a stage 1133—may update (1152) the policy data with a modified and/or new policy to prevent or mitigate future discrepancies.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 12 is a block diagram conceptually illustrating a device 110 that may be used with the system. FIG. 13 is a block diagram conceptually illustrating example components of a remote device, such as the natural language command processing system 120, which may assist with ASR processing, NLU processing, etc., and a skill support system 325. A system (120/325) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/325) may be included in the overall system 100 of the present disclosure, such as one or more natural language processing systems 120 for performing ASR processing, one or more natural language processing systems 120 for performing NLU processing, one or more skill support systems 325, etc. In operation, each of these systems may include computer-readable and computer-executable instructions that reside on the respective device (120/325), as will be discussed further below.

Each of these devices (110/120/325) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/325) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/325) may also be connected to removable or external non-volatile memory and/or storage (such as a removable memory card, memory key drive, networked storage, etc.) through respective input/output device interfaces (1202/1302).

Computer instructions for operating each device (110/120/325) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/325) includes input/output device interfaces (1202/1302). A variety of components may be connected through the input/output device interfaces (1202/1302), as will be discussed further below. Additionally, each device (110/120/325) may include an address/data bus (1224/1124) for conveying data among components of the respective device. Each component within a device (110/120/325) may also be directly connected to other components in addition to (or instead of) being connected to other components across the bus (1224/1124).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1222, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the natural language command processing system 120, or a skill support system 325 may include their own dedicated processors, memory, and/or storage. Alternatively, one or more of the components of the device(s) 110, the natural language command processing system 120, or a skill support system 325 may utilize the I/O interfaces (1202/1302), processor(s) (1204/1304), memory (1206/1306), and/or storage (1208/1308) of the device(s) 110, natural language command processing system 120, or the skill support system 325, respectively. Thus, the ASR component 350 may have its own I/O interface(s), processor(s), memory, and/or storage; the NLU component 360 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill support system 325, as described herein, are illustrative, and may be located as a stand-alone device or may be included, in whole or in part, as a component of a larger device or system.

Figure 14:
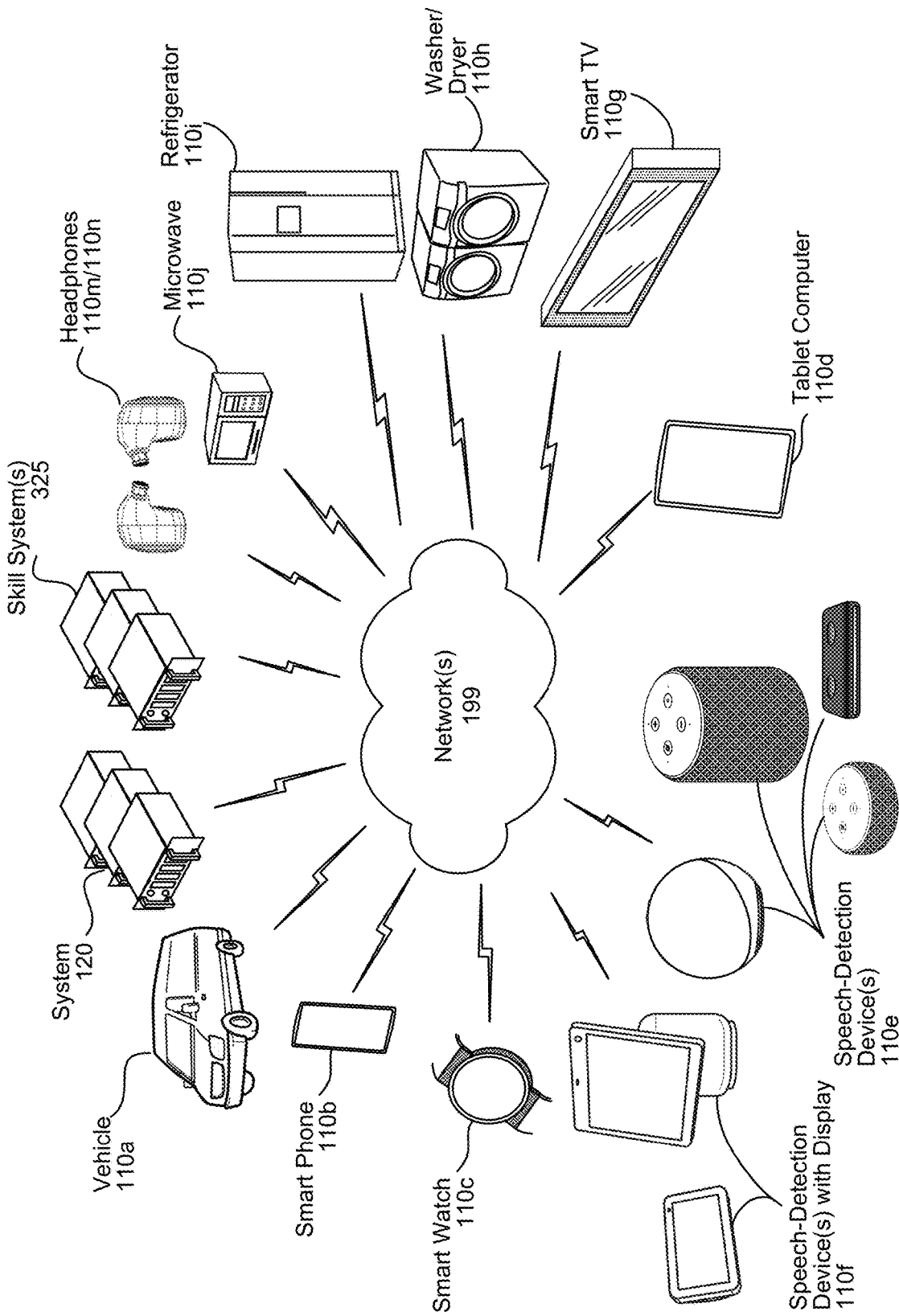
FIG. 14 illustrates an example of a computer network for use with the overall system, according to embodiments of the present disclosure.

As illustrated in FIG. 14, multiple devices (110a-110n, 120, 325) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill support system(s) 325, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 350, the NLU component 360, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, by a first device from a second device, first audio data corresponding to a first utterance received by the second device;
   determining at least one device-specific characteristic of the second device, wherein the at least one device-specific characteristic includes a hardware capability of the second device;
   performing speech processing of the first audio data to determine first command data, wherein the first command data includes at least an intent;
   determining, by the first device and using the at least one device-specific characteristic and the first command data, that the second device is capable of processing the first audio data and executing the first command data;
   determining that the first device is capable of executing the first command data;

in response to determining that the first device and the second device are capable of executing the first command data, determining that the second device is to process the first audio data and execute the first command data; and stopping further processing with regard to the first audio data by the first device.

2. The computer-implemented method of claim 1, further comprising:

receiving skill data regarding a skill executing on the first second device;

determining that the first command data corresponds to the skill; and determining, by the first device and using the skill data, that the skill is capable of executing with respect to the first command data, wherein determining that the second device is capable of executing the first command data is further based at least in part on determining that the skill is capable of executing with respect to the first command data.

3. The computer-implemented method of claim 1, wherein determining that the second device is capable of executing the first command data is based on rule data, the method further comprising:

sending the rule data to the second device such that a first determination by the second device to execute with respect to the first audio data is consistent with a second determination by the first device that the second device is capable of executing the first command data;

performing, by the second device, speech processing of the first audio data to determine second command data;

determining, by the second device using the rule data, that the second device is to execute the second command data; and performing, by the second device, an action indicated by the second command data.

4. The computer-implemented method of claim 1, further comprising:

receiving, from the second device, an indication that the second device failed to perform an action responsive to the first audio data; and in response to the indication, associating the at least one device-specific characteristic with a potential inability to execute a command corresponding to the first command data.

5. A computer-implemented method comprising:

receiving, by a first device from a second device, first input data representing a natural language input received by the second device;

determining first data representing at least one characteristic of the second device;

performing natural language processing of the first input data to determine first command data;

determining, by the first device and using the first data and the first command data, that the second device is capable of performing an action responsive to the natural language input; and in response to determining that the second device is capable of performing an action responsive to the natural language input, stopping further processing with regard to the first input data by the first device.

6. The computer-implemented method of claim 5, further comprising:

determining, by the first device, that the first command data corresponds to a skill executing on the second device; and determining that the skill is capable of performing the action, wherein determining that the second device is capable of performing the action is additionally based on determining that the skill is capable of performing the action on the second device.

7. The computer-implemented method of claim 6, further comprising:

sending, from the first device and to the skill, a request for data regarding a capability of the skill; and receiving, by the first device and in response to the request, skill data regarding the skill, wherein determining that the skill is capable of performing the action is based on the skill data.

8. The computer-implemented method of claim 5, wherein determining that the second device is capable of performing the action is based on rule data, the method further comprising:

sending the rule data to the second device such that a determination by the second device to perform the action is consistent with the determination, by the first device, that the second device is capable of performing the action.

9. The computer-implemented method of claim 8, further comprising:

performing, by the second device, natural language processing of the first input data to determine second command data;

determining, by the second device using the rule data, that the second device is to execute the second command data; and executing, by the second device, the second command data.

10. The computer-implemented method of claim 5, further comprising:

performing, by the second device, natural language processing of second input data to determine second command data;

determining, by the second device, that the second device is capable of performing an action responsive to the second command data;

determining, by the second device using rule data previously received from the first device, that the first device is to execute the second command data; and stopping, by the second device, further processing with regard to the second input data.

11. The computer-implemented method of claim 5, further comprising:

receiving, from the second device, an indication that the second device failed to perform an action responsive to the natural language input; and in response to the indication, associating the first data with a potential inability of the second device to execute a command corresponding to the first command data.

12. The computer-implemented method of claim 5, further comprising:

receiving, from the second device, an indication that the second device failed to perform an action responsive to the natural language input; and in response to the indication, resuming, by the first device, processing with regard to the first input data.

13. The computer-implemented method of claim 5, further comprising:

determining, by the first device based on the first data and second command data representing second input data, that the second device is not capable of performing an action responsive to the second input data;

receiving, from the second device, an indication that the second device performed an action responsive to the second input data; and in response to the indication, associating the first data with a potential ability to execute a command corresponding to the second command data.

14. A first system, comprising:

at least one processor; and at least one memory comprising instructions that, when executed by the at least one processor, cause the first system to:

receive, by a first device from a second device, first input data representing a natural language input received by the second device;

determine first data representing at least one characteristic of the second device;

perform natural language processing of the first input data to determine first command data;

determine, by a first device and using the first data and the first command data, that the second device is capable of performing an action responsive to the natural language input; and in response to determining that the second device is capable of performing an action responsive to the natural language input, stop further processing with regard to the first input data by the first device.

15. The first system of claim 14, wherein the at least one memory further comprises instructions that, when executed by the at least one processor, further cause the first system to:

determine, by the first device, that the first command data corresponds to a skill executing on the second device; and determine that the skill is capable of performing the action, wherein determining that the second device is capable of performing the action is additionally based on determining that the skill is capable of performing the action on the second device.

16. The first system of claim 14, wherein determining that the second device is capable of performing the action is based on rule data, and the at least one memory further comprises instructions that, when executed by the at least one processor, further cause the first system to:

send the rule data to the second device such that a determination by the second device to perform the action is consistent with the determination, by the first device, that the second device is capable of performing the action.

17. The first system of claim 14, wherein the at least one memory further comprises instructions that, when executed by the at least one processor, further cause the first system to:

perform, by the second device, natural language processing of second input data to determine second command data;

determine, by the second device, that the second device is capable of performing an action responsive to the second command data;

determine, by the second device using rule data previously received from the first device, that the first device is to execute the second command data; and stop, by the second device, further processing with regard to the second input data.

18. The first system of claim 14, wherein the at least one memory further comprises instructions that, when executed by the at least one processor, further cause the first system to:

receive, from the second device, an indication that the second device failed to perform an action responsive to the natural language input; and in response to the indication, associate the first data with a potential inability of the second device to execute a command corresponding to the first command data.

19. The first system of claim 14, wherein the at least one memory further comprises instructions that, when executed by the at least one processor, further cause the first system to:

receive, from the second device, an indication that the second device failed to perform an action responsive to the natural language input; and in response to the indication, resume, by the first device, processing with regard to the first input data.

20. The first system of claim 14, wherein the at least one memory further comprises instructions that, when executed by the at least one processor, further cause the first system to:

determine, by the first device based on the first data and second command data representing second input data, that the second device is not capable of performing an action responsive to the second input data;

receive, from the second device, an indication that the second device performed an action responsive to the second input data; and in response to the indication, associate the first data with a potential ability to execute a command corresponding to the second command data.

* * * * *